US008824972B2

(12) United States Patent
Yoneyama et al.

(10) Patent No.: US 8,824,972 B2
(45) Date of Patent: Sep. 2, 2014

(54) RADIO STATION

(75) Inventors: Seijiro Yoneyama, Yokohama (JP);
Akira Ichie, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 188 days.

(21) Appl. No.: 13/406,860

(22) Filed: Feb. 28, 2012

(65) Prior Publication Data
US 2012/0157007 A1   Jun. 21, 2012

Related U.S. Application Data

(63) Continuation of application No. PCT/JP2009/066037, filed on Sep. 14, 2009.

(51) Int. Cl.
| H04B 17/00 | (2006.01) |
| H04W 24/00 | (2009.01) |
| H04L 1/24 | (2006.01) |
| H04L 1/20 | (2006.01) |
| H04W 72/08 | (2009.01) |
| H04W 28/04 | (2009.01) |
| H04W 84/12 | (2009.01) |

(52) U.S. Cl.
CPC ............. *H04W 72/085* (2013.01); *H04L 1/245* (2013.01); *H04B 17/007* (2013.01); *H04B 17/0022* (2013.01); *H04L 1/20* (2013.01); *H04W 28/04* (2013.01); *H04W 84/12* (2013.01)
USPC ........................................ 455/67.11; 455/423

(58) Field of Classification Search
USPC ................................ 455/67.11, 423
See application file for complete search history.

(56) References Cited

U.S. PATENT DOCUMENTS

| 7,339,898 | B2 | 3/2008 | Lee |
| 7,778,214 | B2 | 8/2010 | Sumioka et al. |
| 2003/0117956 | A1* | 6/2003 | Lee ................... 370/232 |
| 2008/0080369 | A1* | 4/2008 | Sumioka et al. ............. 370/229 |
| 2009/0149133 | A1* | 6/2009 | Yoneyama ................. 455/67.13 |

FOREIGN PATENT DOCUMENTS

| CN | 1424858 A | 6/2003 |
| CN | 1842195 A | 10/2006 |
| CN | 101155145 A | 4/2008 |
| CN | 101426215 A | 5/2009 |
| EP | 2 056 497 A2 | 5/2009 |
| JP | 2009-117954 | 5/2009 |

OTHER PUBLICATIONS

OTHER PUBLICATIONS

English-language International Search Report from the Japanese Patent Office in International Application No. PCT/JP2009/066037 mailed Dec. 1, 2009.
Cisco Troubleshooting Technical Notes, "Intermittent Connectivity Issues in Wireless Bridges", Document ID: 66090, pp. 1-7, (2008).
Loiacono, et al., "The Snowball Effect: Detailing Performance Anomalies of 802.11 Rate Adaptation", Proceedings of IEEE GLOBECOM, pp. 5117-5122, (2007).
Yoneyama, et al., "Design and evaluation of the performance-degradation estimation method at a wireless network," IEICE Technical Report, IN2008-64, pp. 123-128, (Sep. 4, 2008).
International Preliminary Report on Patentability and Written Opinion issued by the International Bureau of WIPO on Apr. 11, 2012, for International Application No. PCT/JP2009/066037.
Notification of the First Office Action issued by The Patent Office of the People's Republic of China on Jan. 2, 2014, for Chinese Patent Application No. 200980161420.5, and English-language translation thereof.

\* cited by examiner

*Primary Examiner* — Ping Hsieh
*Assistant Examiner* — Xin Jia
(74) *Attorney, Agent, or Firm* — Finnegan, Henderson, Farabow, Garrett & Dunner, L.L.P.

(57) ABSTRACT

A radio station connected to another radio station via a radio link and identifying a fault of the radio link, including: a radio link controlling unit, a statistical information acquiring unit and a fault identifying unit wherein the radio link controlling unit executes radio link control of the radio link in accordance with a radio link control scheme, the statistical information acquiring unit acquires statistical information indicating a state of the radio link during the execution of the radio link control, and the fault identifying unit identifies the fault of the radio link from among a plurality of faults associated with statistical information, on the basis of the statistical information acquired by the statistical information acquiring unit.

10 Claims, 21 Drawing Sheets

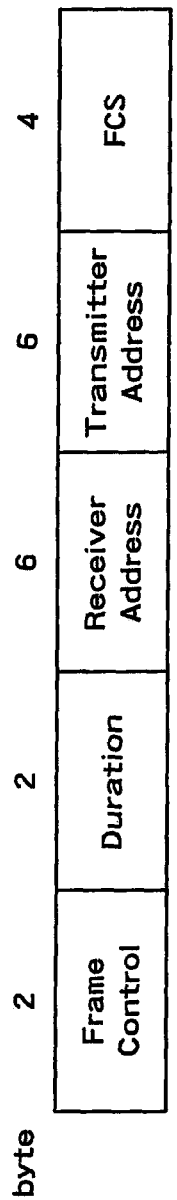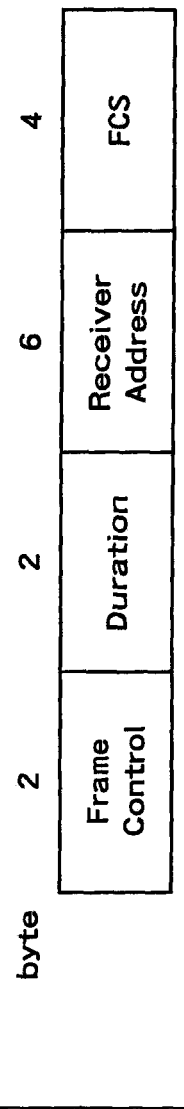
FIG. 7

RELATIONSHIP AMONG RADIO LINK CONTROL SCHEME, FAULTS, STATISTICAL INFORMATION

| SCHEME \ FAULT | CONGESTION | RADIO NOISE | INTERFERENCE | SHADOWING | MULTI-PATH PHASING | HIDDEN TERMINAL | NOISE NEAR CONNECTION-DESTINATION | NO FAULT |
|---|---|---|---|---|---|---|---|---|
| STOP COMMUNICATION: SCHEME 1 | EXISTENCE | EXISTENCE | EXISTENCE | NON-EXISTENCE | NON-EXISTENCE | NON-EXISTENCE | NON-EXISTENCE | NON-EXISTENCE |
| STOP COMMUNICATION: TRANSMIT RTS (THE SAME CHANNEL): SCHEME 1+2 | NON-EXISTENCE | EXISTENCE | EXISTENCE | NON-EXISTENCE | NON-WXISTENCE | NON-EXISTENCE | NON-EXISTENCE | NON-EXISTENCE |
| STOP COMMUNICATION, TRANSMIT RTS (ADJACENT CHANNEL): SCHEME 1+3 | EXISTENCE | EXISTENCE | NON-EXISTENCE | NON-EXISTENCE | NON-EXISTENCE | NON-EXISTENCE | NON-EXISTENCE | NON-EXISTENCE |
| TRANSMIT RTS+NULL (THE SAME CHANNEL): SCHEME 4 | NON-EXISTENCE | EXISTENCE | EXISTENCE | EXISTENCE | EXISTENCE | NON-EXISTENCE | NON-EXISTENCE | NON-EXISTENCE |
| TRANSMIT RTS+NULL (THE SAME CHANNEL, LOW RATE): SCHEME 5 | NON-EXISTENCE | EXISTANCE | EXISTANCE | NON-EXISTENCE | EXISTENCE | NON-EXISTENCE | NON-EXISTENCE | NON-EXISTENCE |

DETERMINATION OF IDENTIFICATION

FIG. 16

RELATIONSHIP AMONG FRAME LOSS RATE MEASUREMENT METHOD, FAULT, LOSS RATE

| FAULT / MEASUREMENT METHOD | CONGESTION | RADIO NOISE | ADJACENT-CHANNEL INTERFERENCE | SHADOWING | MULTI-PATH PHASING | HIDDEN TERMINAL | NOISE NEAR CONNECTION-DESTINATION#12 | NO FAULT |
|---|---|---|---|---|---|---|---|---|
| TRANSMIT NULL (THE SAME CHANNEL): FIRST MEASUREMENT | EXISTENCE | EXISTENCE | EXISTENCE | EXISTENCE | EXISTENCE | EXISTENCE | EXISTENCE | NON-EXISTENCE |
| TRANSMIT RTS+NULL (THE SAME CHANNEL): SECOND MEASUREMENT | NON-EXISTENCE | EXISTENCE | EXISTENCE | EXISTENCE | EXISTENCE | NON-EXISTENCE | EXISTENCE | NON-EXISTENCE |

▨↕▨ DETERMINATION OF IDENTIFICATION

RADIO STATION

CROSS REFERENCE TO RELATED APPLICATIONS

This application is a continuation of International Application No. PCT/JP2009/066037, filed on Sep. 14, 2009, the entire contents of which is hereby incorporated by reference.

FIELD

Embodiments relate to a radio station, for example, a radio terminal and a radio base station.

BACKGROUND

The communication performance of a radio system in conformity with the IEEE802.11 standard significantly deteriorates due to a radio interference fault. Therefore, it is necessary to, when a fault occurs, detect the fault and take measures as soon as possible to stably maintain high reliability of the radio system.

In recent radio systems, a method of detecting a radio interference on the basis of a demodulation error rate of transmission frames ("Intermittent Connectivity Issues in Wireless Bridges", Cisco Troubleshooting Technical notes, Document ID: 66090, January 2008). This is a method which utilizes a phenomenon that, as for a transmission frame influenced by a radio interference, demodulation processing of the frame fails at a radio station, and demodulation errors, such as a PLCP error and a CRC error, increase. There is also a method of identifying a fault of a radio link between radio terminals (JP-A 2009-117954 (Kokai)).

There are various kinds of causes of a radio interference fault, such as interference between frames due to failure in synchronization between radio stations, interference with a jamming wave of a microwave oven, Bluetooth™ or the like using the same frequency band, and multi-path phasing due to a reflected wave from a wall or the like. In order to prevent a radio interference fault, it is necessary to take suitable measures according to the causes described above. For that purpose, a technique for accurately identifying even the classification of the cause of interference is required in addition to the conventional interference detection techniques.

Demodulation errors used by the conventional technique are not a phenomenon that occurs only due to a radio interference. For example, a demodulation error also occurs when a radio wave is received at a low reception level due to a long distance or an obstacle. Therefore, the conventional technique has a possibility of presenting a radio interference fault as an erroneous detection result because, though an interference has not actually occurred, demodulation errors increase due to a different fault.

BRIEF DESCRIPTION OF THE DRAWINGS

FIG. 7 shows the frame formats of an RTS frame and a CTS frame;
FIG. 16 shows relationships among radio link control schemes, faults and statistical information;
FIG. 17 shows relationships among frame loss rate measurement methods, fault factors and frame loss rates.

DETAILED DESCRIPTION

Figure 1:
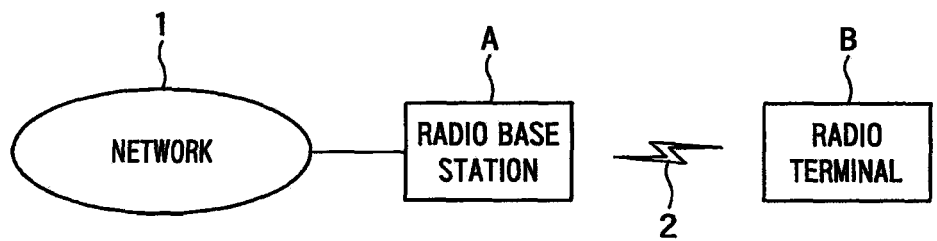
FIG. 1 shows a configuration example of a communication system according to a first embodiment.

There is provided a radio station connected to another radio station via a radio link and identifying a fault of the radio link, including: a radio link controlling unit, a statistical information acquiring unit and a fault identifying unit.

The radio link controlling unit executes radio link control of the radio link in accordance with a radio link control scheme.

The statistical information acquiring unit acquires statistical information indicating a state of the radio link during the execution of the radio link control.

The fault identifying unit identifies the fault of the radio link from among a plurality of faults associated with statistical information, on the basis of the statistical information acquired by the statistical information acquiring unit.

The radio link control scheme includes at least one of:
a scheme 1 in which communication with the another radio station is stopped;
a scheme 2 in which communication by a different radio station using same channel as that used by the another radio station is stopped;
a scheme 3 in which communication by a different radio station using a channel adjacent to the channel used by the another radio station is stopped;
a scheme 4 in which communication by a different radio station using same channel as that used by the another radio station is stopped, and a test frame is transmitted to the another radio station; and
a scheme 5 in which communication by a different radio station using same channel as that used by the another radio station is stopped, and a test frame is transmitted to the another radio station at a lower rate than a rate of the scheme 4.

The statistical information and the faults are associated for each of the schemes 1 to 5.

The fault identifying unit identifies the fault according to one that has been executed among the schemes 1 to 5.

Hereinafter, embodiments will be described below with reference to the drawings.

(First Embodiment)

FIG. 1 shows a configuration example of a communication system according to a first embodiment.

In FIG. 1, reference numeral 1 denotes a network; reference symbol A denotes a radio base station (radio station) connected to the network 1; reference numeral 2 denotes a radio link; and reference symbol B denotes a radio terminal (radio station) connected to the radio link 2. Though only one radio terminal B connected to the radio base station A is shown in FIG. 1, a plurality of radio terminals may be connected. Furthermore, though description will be made with a wireless LAN (Local Area Network) as an example of a radio communication method in this embodiment, the embodiment is applicable to any apparatus if the apparatus adopts a radio communication method based on CSMA/CA (Carrier Sense Multiple Access with Collision Avoidance).

Figure 2:
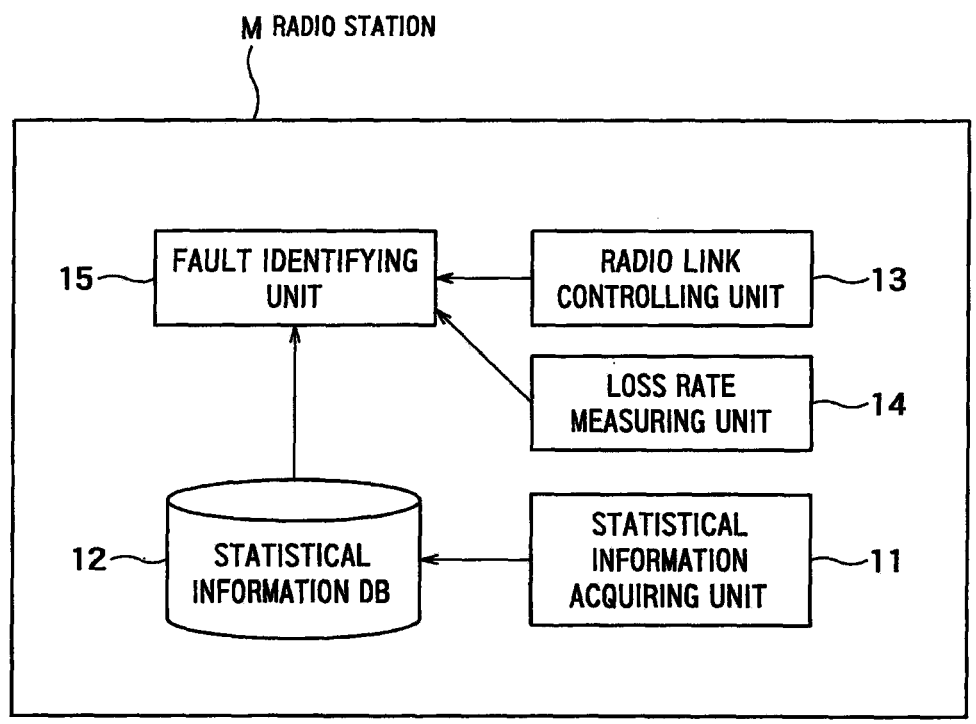
FIG. 2 shows a configuration example of a radio station according to the first embodiment.

FIG. 2 shows a configuration example of a radio station M according to this embodiment. Though the case where the radio station M is the radio terminal B will be described in this embodiment, the radio station M may be the radio base station A. That is, each of components 11, 12, 13, 14 and 15 in FIG. 2 may be implemented on any of the radio terminal B and the radio base station A.

The statistical information acquiring unit 11 acquires statistical information indicating the state of the radio link 2 formed between the radio terminal B and the radio base station A.

The statistical information storage (statistical information DB) 12 stores statistical information acquired by the statistical information acquiring unit 11 together with time information. The time information is acquired from a timer (not shown) provided in the apparatus.

The radio link controlling unit 13 executes radio link control of the radio link 2 in accordance with a radio link control scheme specified in advance.

The loss rate measuring unit (measurement unit) 14 transmits test frames to another radio station (here, the radio base station A) and measures a frame loss rate indicating the rate of frames which have not been correctly received by the radio station M among the transmitted frames. Instead of the frame loss rate, a frame arrival rate indicating the rate of frames correctly received by the radio station may be calculated.

The fault identifying unit 15 identifies of a fault of a radio link among a plurality of faults associated with statistical information in advance, on the basis of statistical information acquired during radio link control by the radio link controlling unit 13. Association between the statistical information and the fault factors is prepared for each radio link control scheme. The fault identifying unit 15 holds correspondence between frame loss rates and the faults, and identifies the fault of the radio link using a frame loss rate measured by the loss rate measuring unit 14.

Each of the components 11, 12, 13, 14 and 15 may be configured as hardware or may be realized as a software module (program) executed on the radio station M. When it is realized as software, the software module may be stored in a non-transitory computer-readable medium so that it is read and executed by a computer such as a CPU.

The details of each of the components 11 to 15 will be described below.

Figure 3:
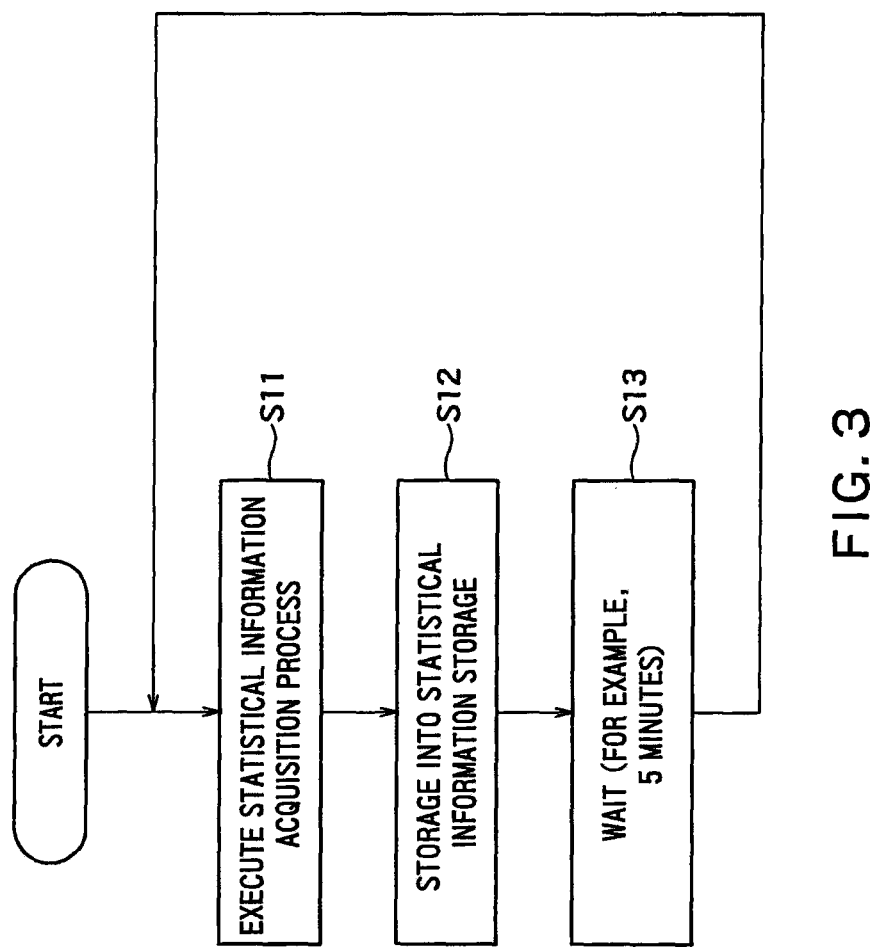
FIG. 3 shows the flow of an example of a procedure for a process by a statistical information acquiring unit.

FIG. 3 shows the flow of an example of a procedure for a process by the statistical information acquiring unit 11.

By executing a process of acquiring statistical information specified in advance, the statistical information acquiring unit 11 acquires the statistical information (step S11). Examples of the statistical information specified in advance are shown below.

<Examples of Statistical Information>

(1) The number of failures in PLCP preamble synchronization
(2) The number of PLCP parity errors
(3) The number of incorrect PLCP rates
(4) The number of incorrect PLCP services
(5) The number of CRC errors
(6) Noise level
(7) EVM (Error Vector Magnitude)

The number of failures in PLCP preamble synchronization of (1) is a value indicating the number of times of failing in preamble synchronization in a frame receiving process at a PLCP layer of IEEE802.11.

The number of PLCP parity errors of (2) is a value indicating the number of times a parity error occurs in the frame receiving process at the PLCP layer of IEEE802.11.

The number of incorrect PLCP rates of (3) is a value indicating the number of times the rate of a received frame is incorrect in the frame receiving process at the PLCP layer of IEEE802.11. "Incorrect" means that, for example, a value stored in a frame rate field is different from a regulation value.

The number of incorrect PLCP services of (4) is a value indicating the number of times the service of a received frame is incorrect in the frame receiving process at the PLCP layer of IEEE802.11. "Incorrect" means that, for example, a value stored in a service field is different from a regulation value.

The number of CRC errors of (5) is a value indicating the number of times FCS error checking indicates incorrectness in the frame receiving process at a MAC layer of IEEE802.11.

Noise level of (6) is a value indicating the amount of noise in a received signal in IEEE802.11. The noise level is measured, for example, for each channel.

The EVM of (7) is an indicator indicating the waveform quality of a digital modulation signal. Specifically, the EVM indicates difference between the following (A) and (B): (A) an amplitude and a phase of an actual digital modulation signal, (B) an amplitude and a phase which are specified in advance according to modulation schemes.

The values of the statistical information of (1) to (7) increase, for example, when an interference wave is received or when demodulation of a frame received at a low reception level fails.

Statistical information to be acquired may be one or more pieces of the statistical information of (1) to (7). Other kinds of statistical information may be acquired without limiting the statistical information to be acquired to the above statistical information of (1) to (7).

Next, the statistical information acquiring unit 11 stores the acquired statistical information into the statistical information storage 12 together with time information (step S12).

It is possible to return to step S11 after waiting for a predetermined period of time (step S13) in order to cyclically execute acquisition of statistical information. For example, in the case of a statistics acquisition tool on the Internet, the interval of the cycle is generally five minutes. It is also possible to keep the interval of the cycle constant by determining the waiting time of step S13 to be in synchronization with a cycle timer, and improve the accuracy. In the case of acquiring a plurality of pieces of statistical information, there may be used a method of setting an individual interval of the cycle for each piece of statistical information to acquire them. As for statistical information that fluctuates in a short time, it is possible to measure a mean value, a maximum value, a minimum value, a standard deviation and the like on the radio terminal B and acquire them as statistical information.

The statistical information acquisition process (S11 to S13) by the statistical information acquiring unit 11 may be started and ended, for example, in response to an instruction from the fault identifying unit 15. The acquisition process may be continuously performed while the apparatus is in operation.

The fault identifying unit 15 identifies a fault of a radio link using the statistical information acquiring unit 11, the statistical information DB 12 and the radio link controlling unit 13 (a first process). Alternatively, the fault identifying unit 15 identifies the fault of the radio link using the statistical information acquiring unit 11, the statistical information DB 12, the radio link controlling unit 13 and the loss rate measuring unit 14 (a second process).

Figure 4:
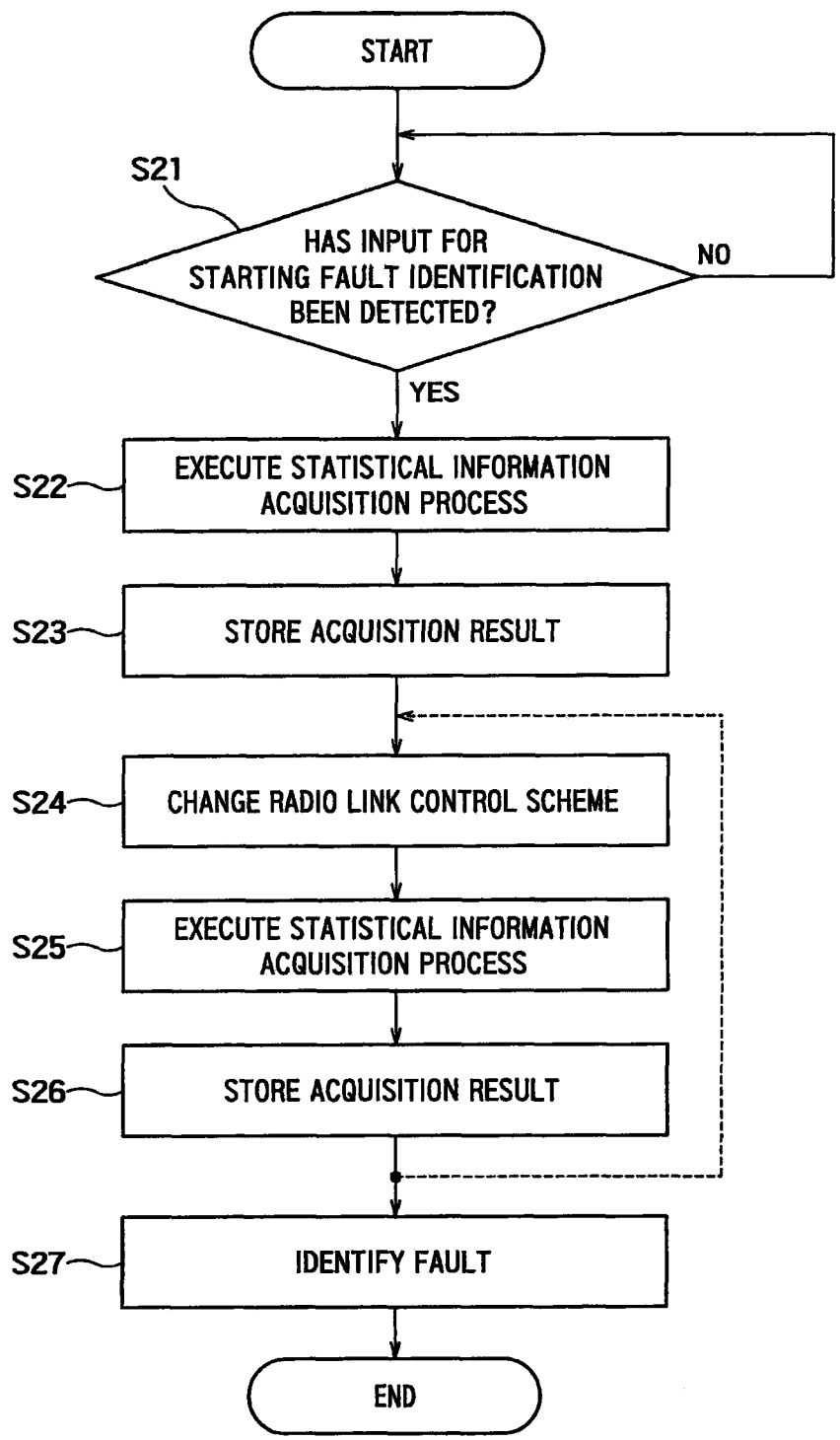
FIG. 4 shows the flow of an example of a procedure for a first process by a fault identifying unit.

FIG. 4 shows the flow of an example of a procedure for the first process by the fault identifying unit 15.

First, the fault identifying unit 15 detects an input for starting the process (step S21). The start input is, for example, a periodical input from the cycle timer or the like, or a particular instruction from an administrator. If the start input is periodically given to the fault identifying unit 15 as in the former case, it is possible to periodically monitor the state of fault occurrence. If an instruction from an administrator is given as a start input as in the latter case, it is possible for the administrator to identify a fault on demand and in real time. A start instruction may be inputted to the fault identifying unit 15 when the radio station M detects an error of demodulation of a frame. A start instruction may be inputted when the value of statistical information exceeds a threshold specified in advance or when the frame loss rate exceeds a predetermined value.

When receiving a start input, the fault identifying unit 15 acquires statistical information using the statistical information acquiring unit 11 (step S22) and stores the acquired statistical information into the statistical information DB 12 (step S23). When a value is acquired a plurality of times for statistical information of the same kind, a mean value, a maximum value, a minimum value, a standard deviation and the like may be stored and treated as statistical information. It is also possible to, when the value of the statistical information acquired at steps S22 and S23 is equal to or below a threshold, determine that a fault has not occurred in a radio link and prevent the process at and after step S24 from being performed. That is, step S24 and the subsequent steps may be performed only when the value of the statistical information is above the threshold. It is also possible to skip steps S22 and S23 themselves and proceed to step S24 immediately after step S21.

Next, the fault identifying unit 15 instructs the radio link controlling unit 13 to execute radio link control, and the radio link controlling unit 13 executes the radio link control in accordance with a radio link control scheme given in advance (step S24). Examples of typical radio link control schemes (schemes 1 to 3) will be shown. However, the radio link control schemes are not limited to those shown below. Other kinds of schemes also exist as described later. The details of each scheme will be described later.

(Scheme 1) To stop communication between the radio station M and another radio station to which the radio station M is connected (Scheme 2) To stop communication of a different radio station using the same channel as used for communication between the radio station M and another radio station to which the radio station M is connected (Scheme 3) To stop communication of a different radio station using a channel adjacent to the channel used for communication between the radio station M and another radio station to which the radio station M is connected.

The fault identifying unit 15 acquires statistical information using the statistical information acquiring unit 11 in when the radio link control at step S24 is being executed (step S25), and stores the acquired statistical information into the statistical information DB 12 (step S26).

In the case of performing each of a plurality of radio link control schemes, steps S24 to S26 are repeatedly performed (see a broken line arrow in the figure). In this case, radio link control performed immediately before is invalidated. When in the case of repetition, steps S22 to S26 may be repeated.

Here, each of the radio link control schemes 1 to 3 will be described in detail.

(Scheme 1) In this example (in which the radio station M is the radio terminal B and another radio station is the radio base station A), the scheme 1 is for performing control to stop communication between the radio terminal B and the radio base station A. Specifically, data transmission by the radio terminal B is stopped, and the radio base station A stops data transmission to the radio terminal B. As a method for causing the radio base station A to stop data transmission to the radio terminal B, it is possible to define a special frame for instructing the stop of transmission and stop the data transmission by the radio terminal B transmitting the frame to the radio base station A. It is also possible to cause the radio base station A to stop data transmission to the radio terminal B by causing the radio terminal B to transition to a PS (Power Save) mode defined in the IEEE802.11 standard.

Figure 5:
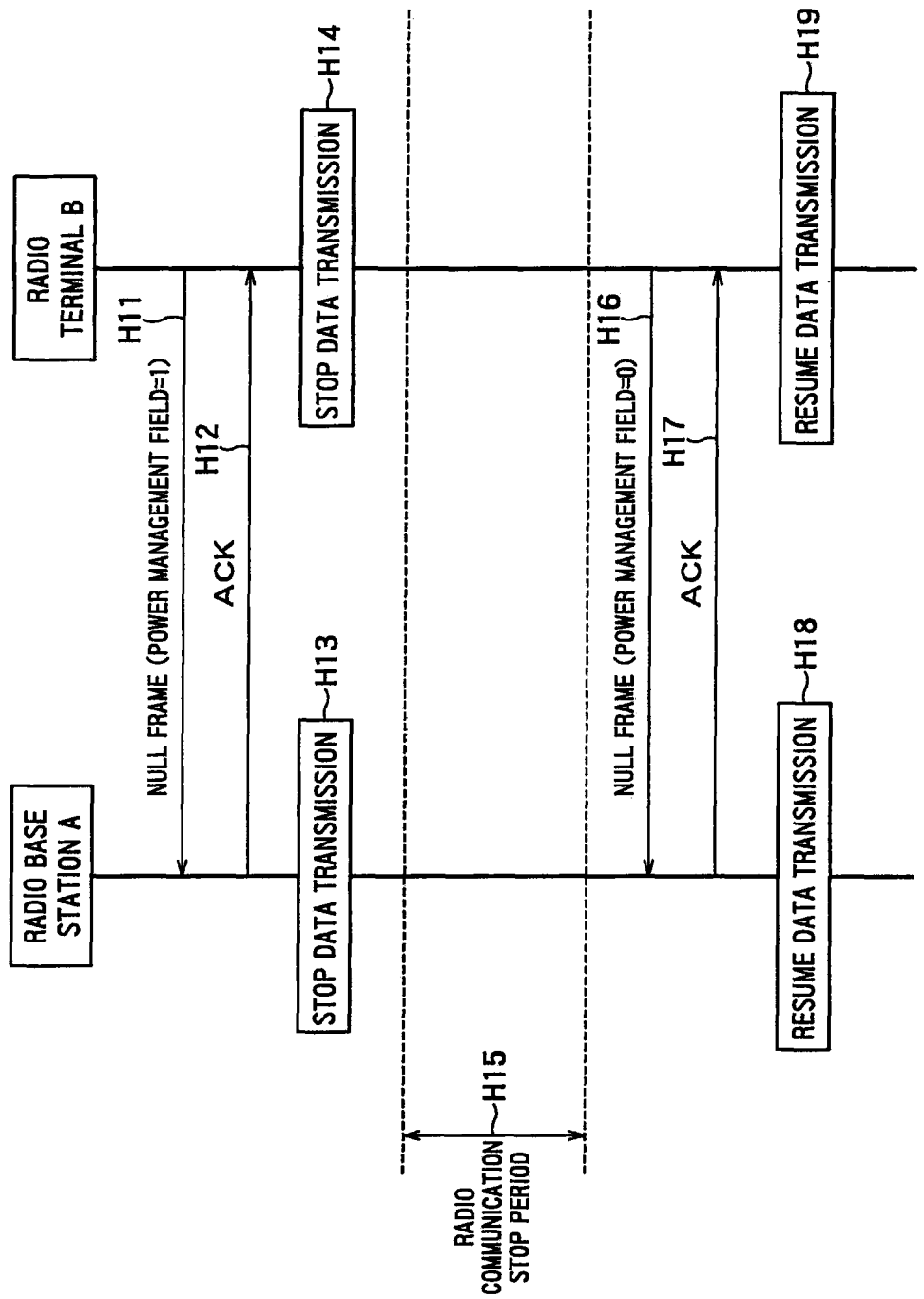
FIG. 5 shows the flow of a process for transitioning to a PS mode.

FIG. 5 shows the flow of a process for the radio terminal B to transition to the PS mode using a null frame.

Figure 6:
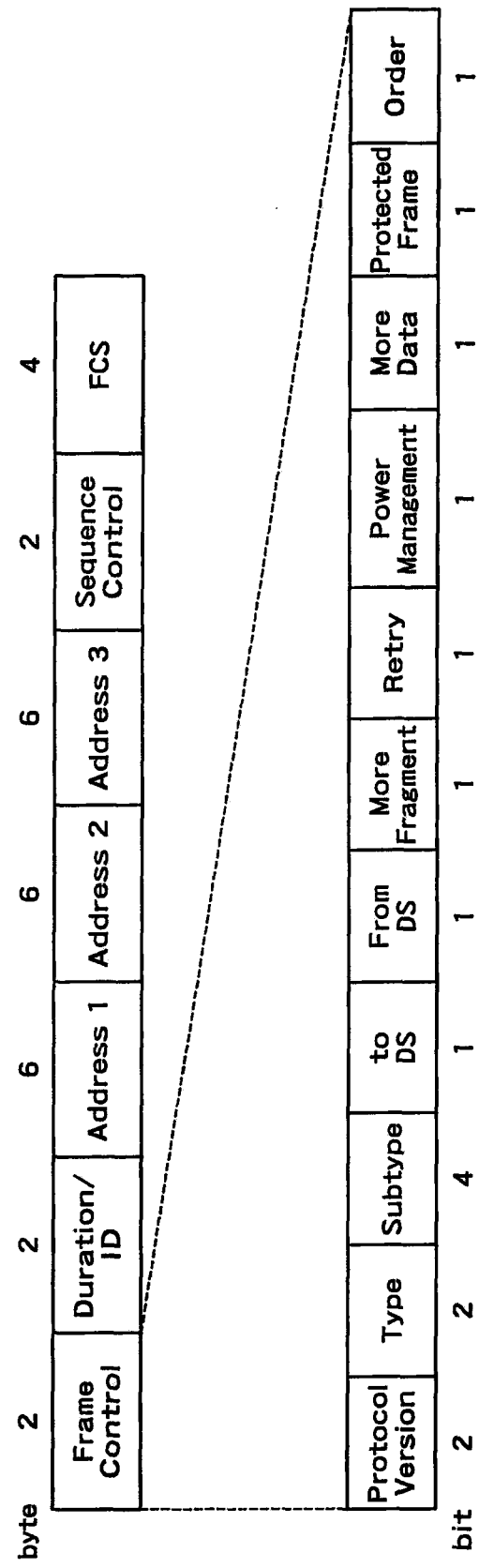
FIG. 6 shows the frame format of a null frame.

First, the radio terminal B transmits a null frame to the radio base station A (H11). FIG. 6 shows the frame format of a null frame defined in the IEEE802.11 standard. In order to notify the radio base station A of transitioning to the PS mode, "1" is set in a power management field (the Power Management field in FIG. 6) of the null frame. Receiving the null frame, the radio base station A recognizes that the radio terminal B has transitioned to the PS mode and returns ACK to the radio terminal B (H12). After that, the radio base station A stops data transmission to the radio terminal B (H13). Receiving the ACK, the radio terminal B stops data transmission (H14). Thereby, radio communication between the radio base station A and the radio terminal B can be stopped (H15). In the case of releasing the stop of radio communication, the radio terminal B transmits a null frame in which "0" is set in the power management field, to the radio base station A (H16). Receiving the null frame, the radio base station A recognizes that the radio terminal B has released the PS mode and returns ACK to the radio terminal B (H17). After that, the radio base station A resumes data transmission to the radio terminal B (H18). Receiving the ACK, the radio terminal B resumes data transmission (H19). Thus, the stop of radio communication between the radio base station A and the radio terminal B can be released.

Here, it is characteristic that, if the radio terminal B receives an interference wave when control to stop communication between the radio base station A and the radio terminal B has been performed, it is a radio wave originated from a third-party device. For example, in the case of a fault such as shadowing and multi-path phasing to be described later, the radio wave originated from the radio terminal B itself becomes the fault. Therefore, if the fault is shadowing, multi-path phasing or the like, the value of statistical information (for example, the noise level of the channel used) will be decreased by performing the radio link control of the scheme 1. In the case of a fault due to congestion, radio noise or adjacent-channel interference to be described later, it is the fault that the radio terminal B receives a radio wave originated from a third-party device. Therefore, even after performing the radio link control of the scheme 1, the value of statistical information (for example, the noise level of the channel used) will be continuously large. By utilizing these characteristics to compare the value of statistical information acquired after performing the radio link control of the scheme 1 (S25) with a threshold, the fault can be identified.

(Scheme 2) In this example, the scheme 2 is for performing control to stop communication of a different radio terminal which performs communication via the same channel as used for communication between the radio base station A and the radio terminal B. As a method for stopping the communication of the different radio terminal, there is, for example, a method in which an RTS frame or a CTS frame defined in the IEEE802.11 standard is used. FIG. 7 shows the frame formats of the RTS frame and the CTS frame. The RTS frame and the CTS frame have a duration field (the Duration field in FIG. 7) for setting a scheduled period used for radio communication, and the different radio terminal which has received the RTS frame or the CTS frame inhibits transmission (NAV: Network Allocation Vector) during the period set in the duration field. Thus, it is possible to stop communication of the different radio terminal performing communication via the same channel as used for communication between the radio base station A and the radio terminal B, by the radio terminal B transmitting an RTS frame or a CTS frame in which a desired period during which communication of the different radio communication is to be inhibited is set in its duration field.

Here, it is only for such a radio terminal that is in conformity with the IEEE802.11 standard that communication is stopped by receiving an RTS frame or a CTS frame. Origination of a radio wave by a device which is not in conformity with the IEEE802.11 standard is not prevented. Therefore, by utilizing this characteristic to determine whether or not the value of statistical information (for example, the noise level of the channel used) is still large even after performing the radio link control of the scheme 2, it is possible to identify whether the fault is due to a radio wave originated from a device which is in conformity with the IEEE802.11 standard or originated from a device which is not in conformity with the IEEE802.11 standard. For example, if the value of statistical information before performing the radio link control (S22) is above a threshold, and the value of statistical information after performing the radio link control (S25) is equal to or below the threshold, the fault can be presumed to be congestion.

(Scheme 3) In this example, the scheme 3 is for performing control to stop communication of a different radio terminal which performs communication using a channel adjacent to the channel used for communication between the radio base station A and the radio terminal B. Similarly to the scheme 2, communication of the different radio terminal is stopped with the use of an RTS frame or a CTS frame. In this scheme, however, the RTS frame or the CTS frame is transmitted with the use of the adjacent channel. Thereby, communication of the radio terminal which performs communication using the adjacent channel is stopped. Therefore, for example, if the value of statistical information (for example, the noise level of the channel used) before performing the radio link control of the scheme 3 is above a threshold, and the value of the statistical information (for example, the noise level of the channel used) after performing the radio control is equal to or below the threshold, the fault can be presumed to be a radio wave originated from a radio terminal which performs communication using an adjacent channel (adjacent-channel interference).

In addition to the schemes shown above, a scheme 4 in which a test frame is transmitted to the radio base station A after stopping communication of the different radio terminal which uses the same channel as used for communication between the radio base station A and the radio terminal B, and a scheme 5 in which a test frame is transmitted at a lower rate than that of the scheme 4 after stopping communication of the different radio terminal which uses the same channel as used for communication between the radio base station A and the radio terminal B are also possible (see FIG. 16 to be described later). The test frame may be transmitted with the use of a test frame transmission function of the loss rate measuring unit 14 to be described later. Here, transmission and receiving of the test packet may be executed a plurality of times to increase the accuracy of measurement. By decreasing the transmission rate of the test packet to a low rate as in the scheme 5, it is possible to perform measurement in a state that the tolerability to space loss of a radio wave propagation path is enhanced, and thereby, it is possible to distinguish between multi-path phasing and shadowing as described later. Four kinds of available transmission rates, 1, 2, 5.5 and 11 Mbps, are defined in the IEEE802.11b standard. In the scheme 5, the tolerability is enhanced by using a rate lower than that of the scheme 4, among these rates, to conduct the test.

A scheme 1+2 in which the schemes 1 and 2 are simultaneously executed (communication between the radio terminal B and the radio base station A is stopped, and communication of the different radio terminal which performs communication via the same channel is also stopped) and a scheme 1+3 in which the scheme 1 and the scheme 3 are simultaneously executed (communication between the radio terminal B and the radio base station A is stopped, and communication of the different radio terminal which performs communication via an adjacent channel is also stopped) are also possible (see FIG. 16 to be described later).

Lastly, when having ended the process of steps S22 to S26, the fault identifying unit 15 identifies the fault using correspondence information (first correspondence information) in which faults and statistical information are associated for each radio link control scheme, on the basis of statistical information obtained during the radio link control (step S27). The correspondence information is, for example, such that ranges of values of statistical information and faults are associated for each radio link control scheme. As the range of values of statistical information, for example, a range of values of statistical information equal to and above a threshold and a range of values below the threshold may be used. The threshold may be a different value for each fault. The fault identifying unit 15 identifies such a fault that the value of statistical information acquired according to the performed radio link control scheme is included within the range. When a plurality of radio link control schemes are performed, faults can be gradually narrowed. A concrete example of step S27 will be described later.

Figure 8:
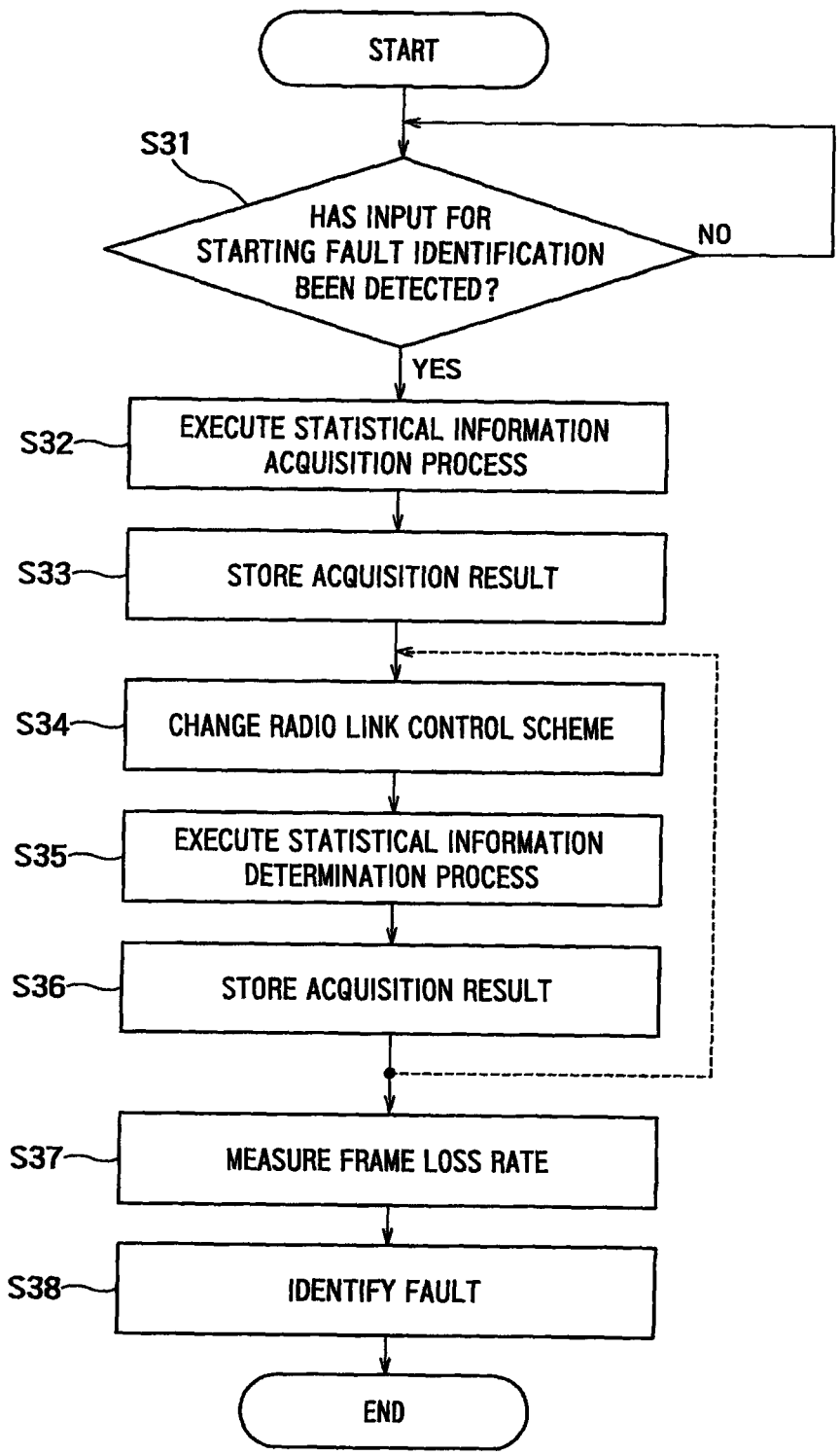
FIG. 8 shows an example of a procedure for a second process by the fault identifying unit.

FIG. 8 shows an example of a procedure for a second process by the fault identifying unit 15. In this second process, it is possible to identify the fault in more detail than the first process described above by further using the loss rate measuring unit 14. Since steps S31 to S36 are the same as steps S21 to S26 in FIG. 4, repeated description will be omitted.

At step S37, the loss rate measuring unit 14 measures a frame loss rate in communication between the radio base station A and the radio terminal B. The measurement of the frame loss rate is performed by transmitting a test packet from the radio terminal B to the radio base station A and receiving a response frame. As the test packet, for example, a null frame defined in the IEEE802.11 can be used (see FIG. 6).

In a situation where CSMA/CA does not effectively function as in the case of a hidden terminal to be described later, measurement may be performed after reserving a period expected to be required for measurement using an RTS frame to avoid frame collision with a hidden terminal. If the cause of frame loss is a frame collision with a hidden terminal, the frame loss rate will be decreased by conducting a test using an RTS frame. Therefore, by conducting the test using an RTS frame, it is possible to identify whether a frame collision due to a hidden terminal has occurred or not.

Lastly, when having ended the process of steps S31 to S36, the fault identifying unit 15 identifies the fault using correspondence information (the first correspondence information) in which faults and ranges of values of statistical information are associated for each radio link control scheme and correspondence information (second correspondence information) in which ranges of frame loss rate values and faults are associated, on the basis of acquired statistical information and a measured frame loss rate (step S38). For example, one or a plurality of faults are identified from the first correspondence information as described for step S27 in FIG. 4, and a fault which covers the value of the measured frame loss rate is limited as a final fault from among the identified faults. A concrete example of step S38 will be described later.

Next, detail of the faults will be described. A radio base station and a radio terminal will be called as an AP and an STA, respectively, below for simplification of the description.

Figure 9:
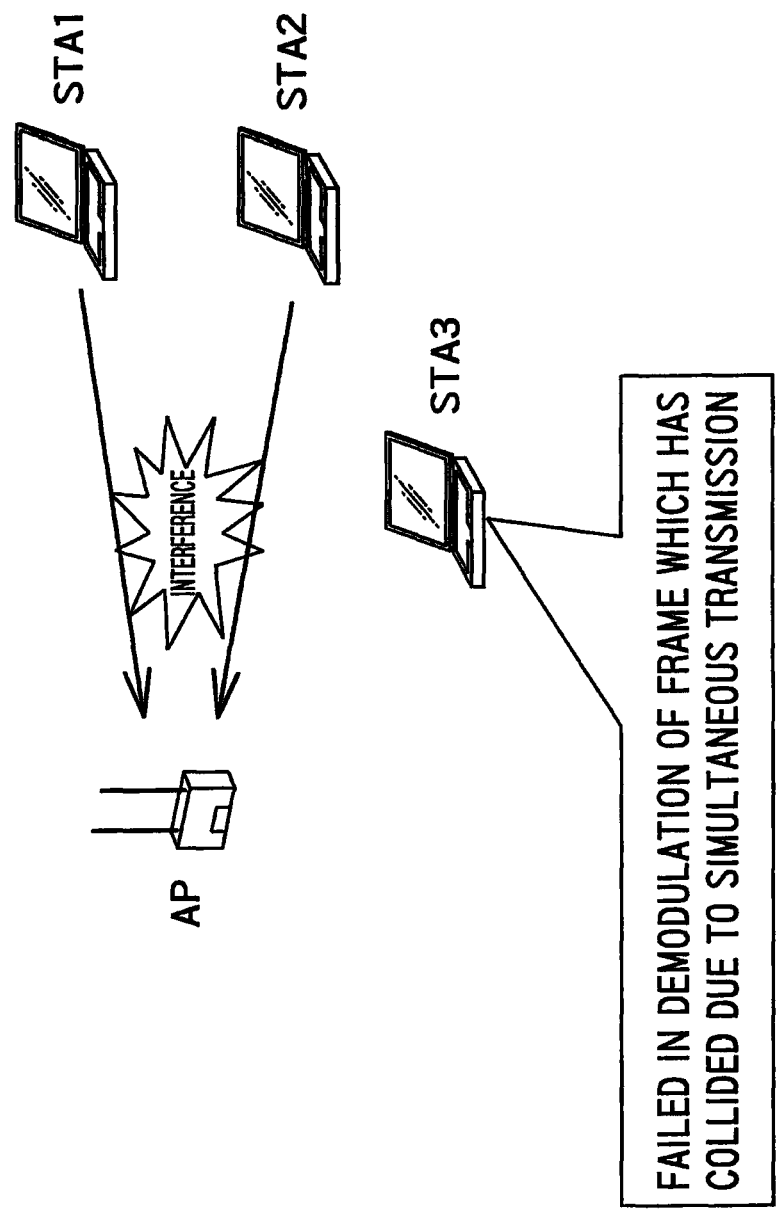
FIG. 9 shows a state in which congestion has occurred.

"Congestion" is defined as a state in which the number of STAs belonging to a certain channel increases, and collision avoidance by CSMA/CA frequently occurs in all APs and STAs belonging to the channel. In a congestion state, the probability of failure in synchronization processing of frames transmitted between STAs becomes high, and a frame collision due to simultaneous transmission occurs. FIG. 9 shows a state in which STA1, STA2 and STA3 are connected to AP, and congestion has occurred. If STA1 and STA2 perform simultaneous transmission, interference due to a frame collision occurs. STA3 which receives the interfered frame fails in demodulation of the frame, and the value of statistic information described before increases. An example of simultaneous transmission which occurs between STA1 and STA2 is shown here. In the case where simultaneous transmission occurs between AP and STA1 or between AP and STA2 also, STA3 fails in frame demodulation, and the value of statistical information increases.

Figure 10:
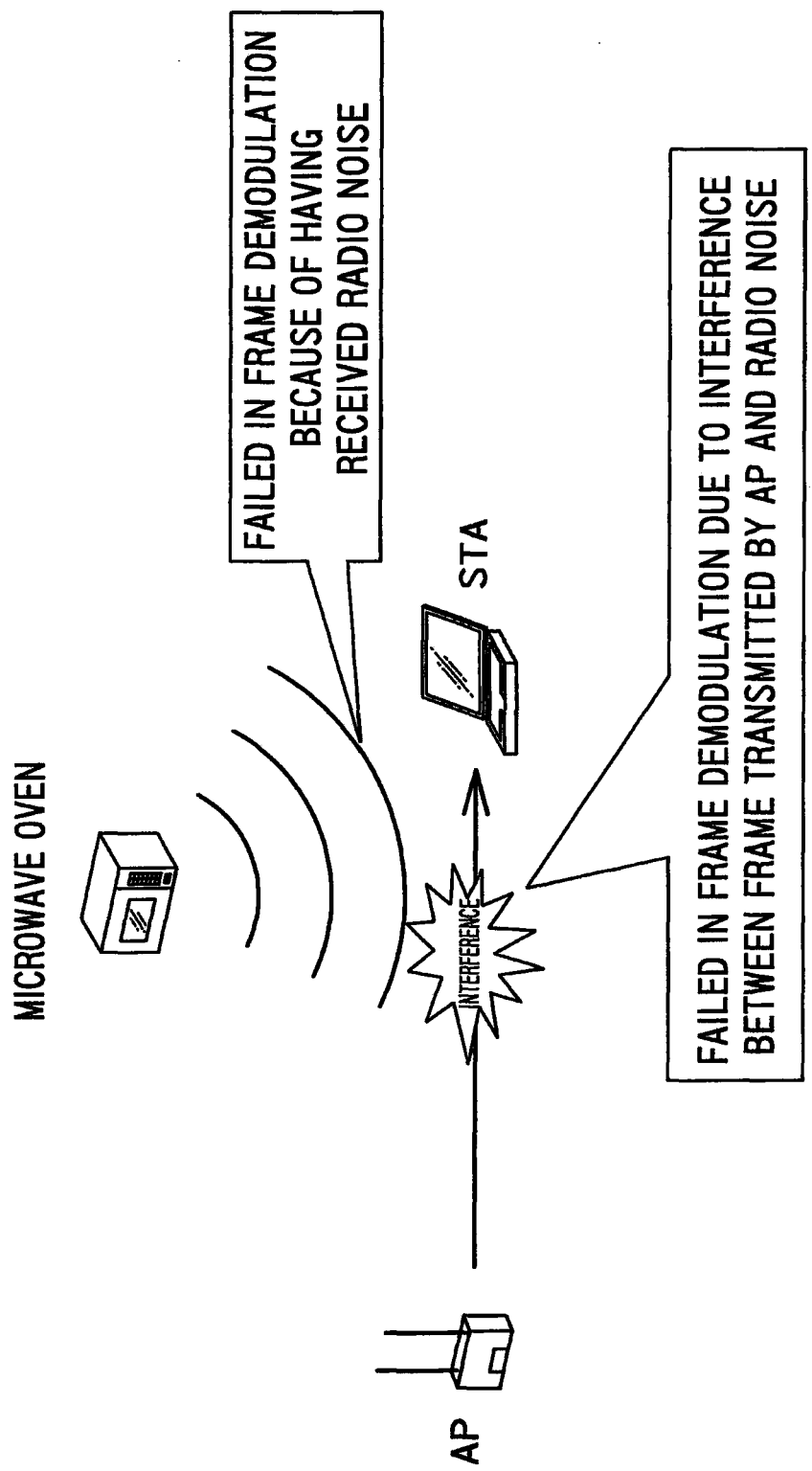
FIG. 10 shows a state in which interference due to radio noise has occurred.

"Radio noise" is defined as a state in which a radio wave of the same frequency band from a microwave oven, Bluetooth™ or the like, which is in conformity with a standard different from IEEE802.11, arrives at STA. FIG. 10 shows a state in which interference due to radio noise (a microwave oven) has occurred. Receiving the radio noise, STA starts a frame receiving process but fails in demodulation, and the value of statistical information increases. In the case where a frame transmitted to STA by AP and radio noise interfere with each other also, frame demodulation fails, and the value of statistical information increases.

Figure 11:
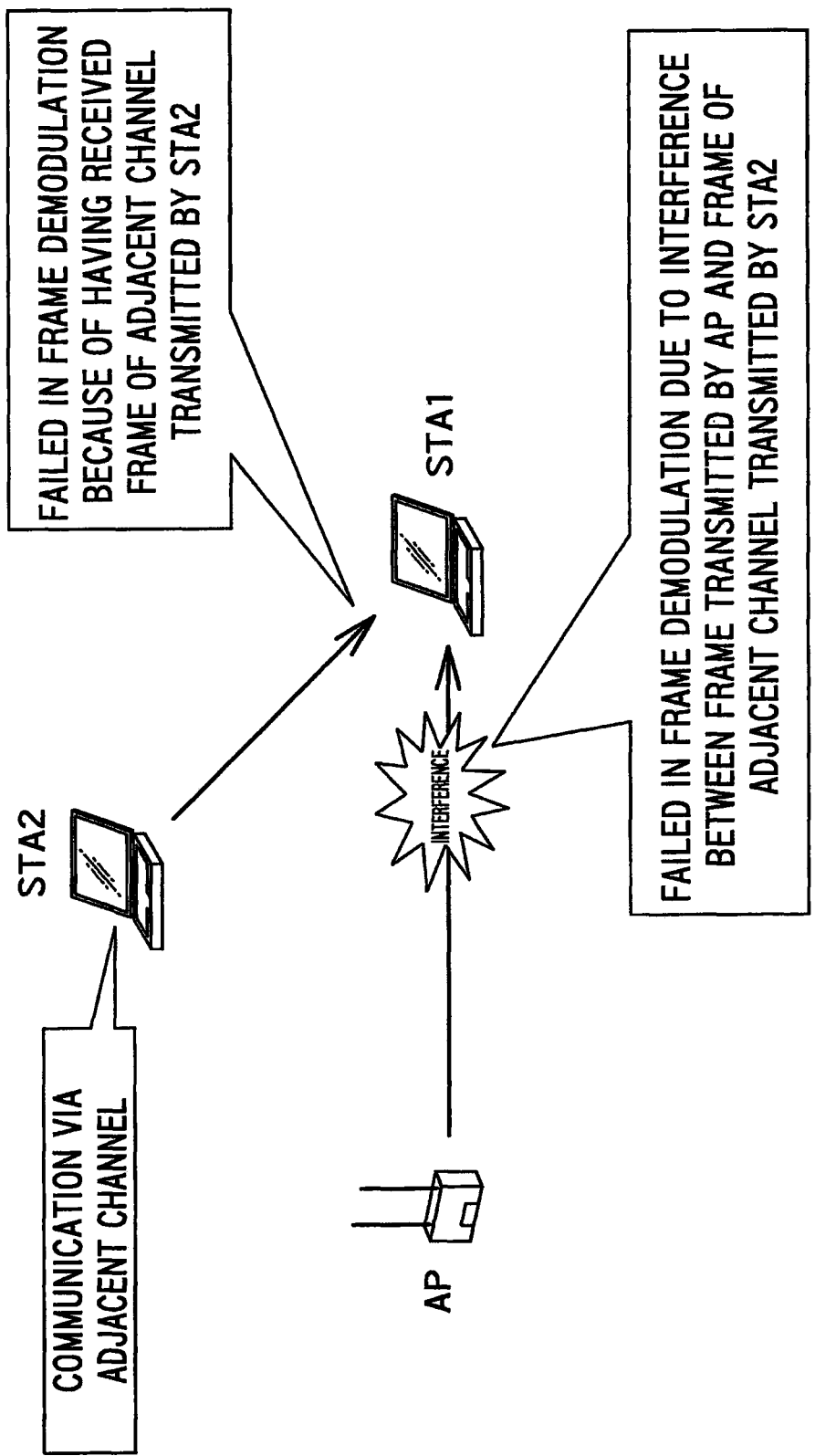
FIG. 11 shows a state in which adjacent-channel interference has occurred.

"Adjacent-channel interference" is defined as a state in which a radio wave of a channel adjacent to a channel used by STA arrives at STA. In the IEEE802.11b/g standard, the band of 2400 MHz to 2497 MHz is divided into fourteen channels. The bands of adjacent channels, however, overlap with each other, and interference occurs if they are used at the same time. FIG. 11 shows a state in which adjacent-channel interference has occurred. STA2 performs communication using a channel adjacent to a channel used by STA1 and AP. In this case, STA1 which receives a frame on the adjacent channel transmitted by STA2 fails in demodulation of the frame, and the value of statistical information increases. In the case where a frame transmitted to STA1 by AP and a frame transmitted by STA2 interfere with each other also, frame demodulation fails, and the value of statistical information increases.

Figure 12:
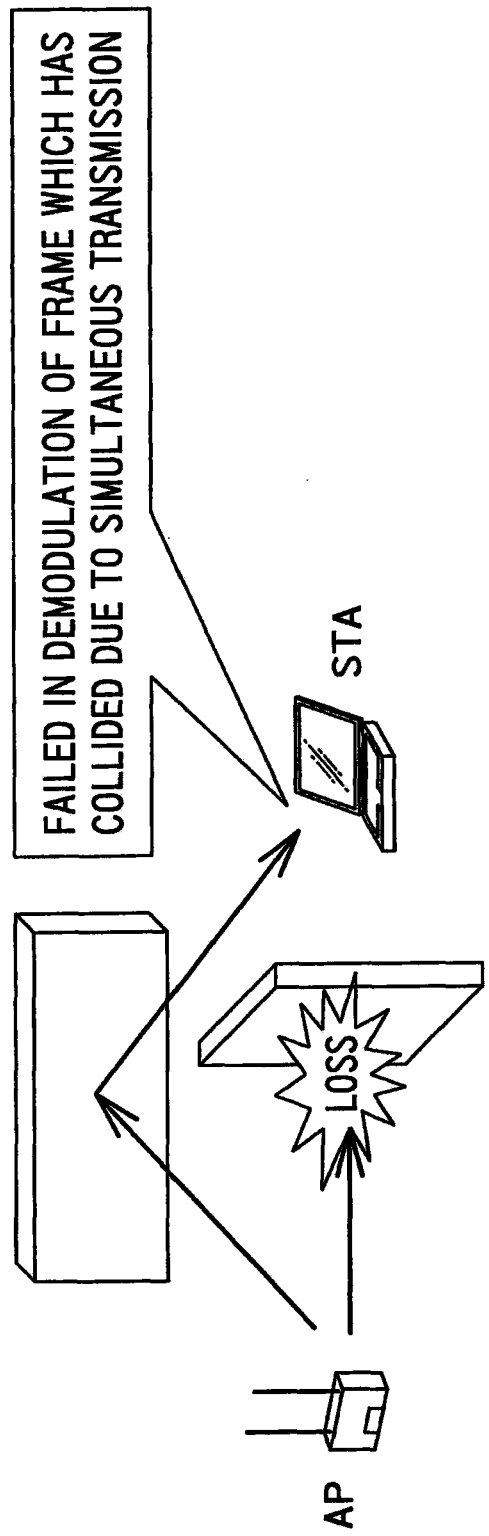
FIG. 12 shows a state in which shadowing has occurred.

"Shadowing" is defined as a state in which a direct wave is blocked by an obstacle between STA and AP, and communication is performed via a reflected wave or a diffracted wave. FIG. 12 shows a state in which shadowing has occurred. When shadowing occurs, the signal power of a frame received by STA is weakened, and therefore, the STA fails in demodulation of the frame, and the value of statistical information increases. In the case where the distance between AP and STA is long and the signal strength significantly decreases due to propagation loss also, frame demodulation fails, and the value of statistical information increases.

Figure 13:
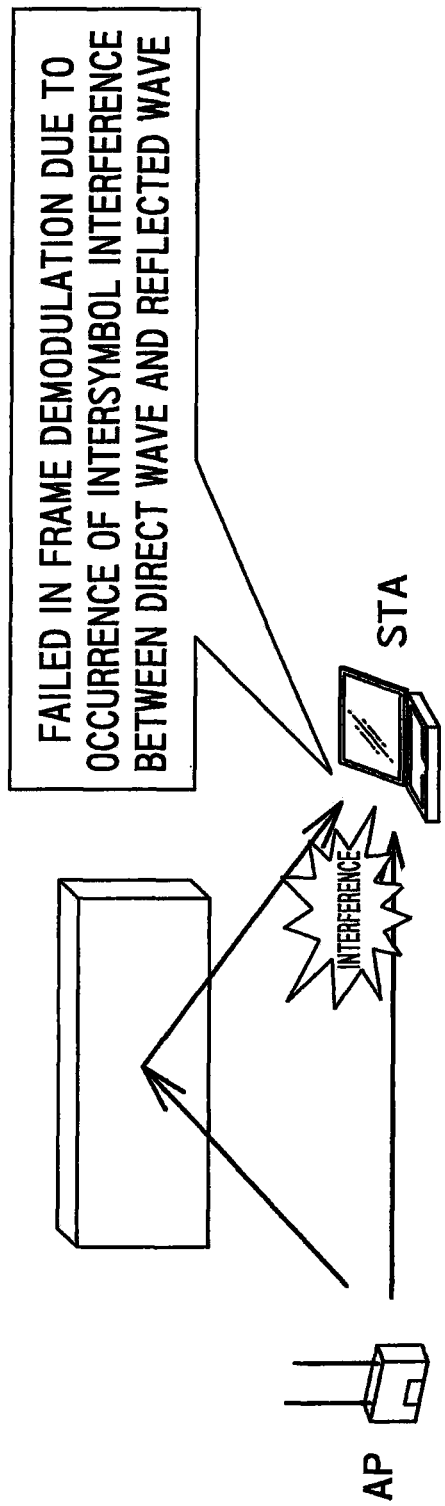
FIG. 13 shows a state in which interference due to multipath phasing has occurred.

"Multi-path phasing" is defined as a state in which, in addition to a direct wave transmitted by AP, a reflected wave caused by a wall or the like arrives at the STA in delay. FIG. 13 shows a state in which interference due to multi-path phasing has occurred. When multi-path phasing occurs, intersymbol interference occurs between the direct wave transmitted by AP and the reflected wave which arrives in delay. Therefore, STA fails in frame demodulation, and the value of statistical information increases.

Figure 14:
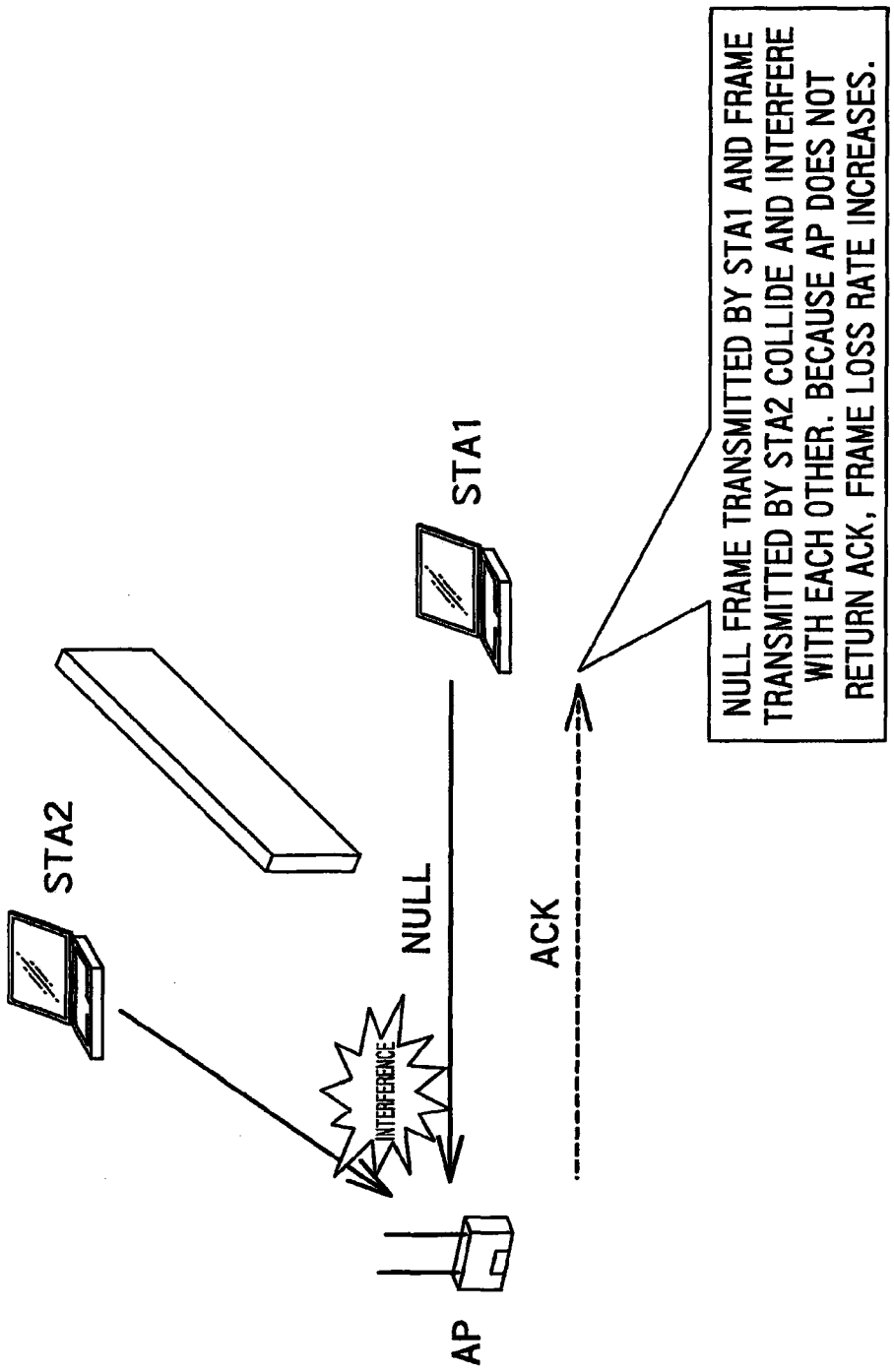
FIG. 14 shows a state in which two radio terminals are in a hidden terminal relationship with each other.

"Hidden terminal" is defined as a state in which an obstacle or the like exists between certain STAs, and their carrier sense does not function. FIG. 14 shows a state in which STA1 and STA2 are hidden terminals to each other. In the case where STA1 and STA2 are hidden terminals to each other, such a situation occurs that, though STA1 is transmitting data to AP, STA2 starts transmission of data to AP. As a result, frames collide and interfere with each other. In the case of hidden terminal, failure in frame demodulation does not occur at STA1 and STA2. AP fails, however, in receiving of the frame transmitted by STA1 and does not return ACK, and therefore, the frame loss rate of STA increases.

Figure 15:
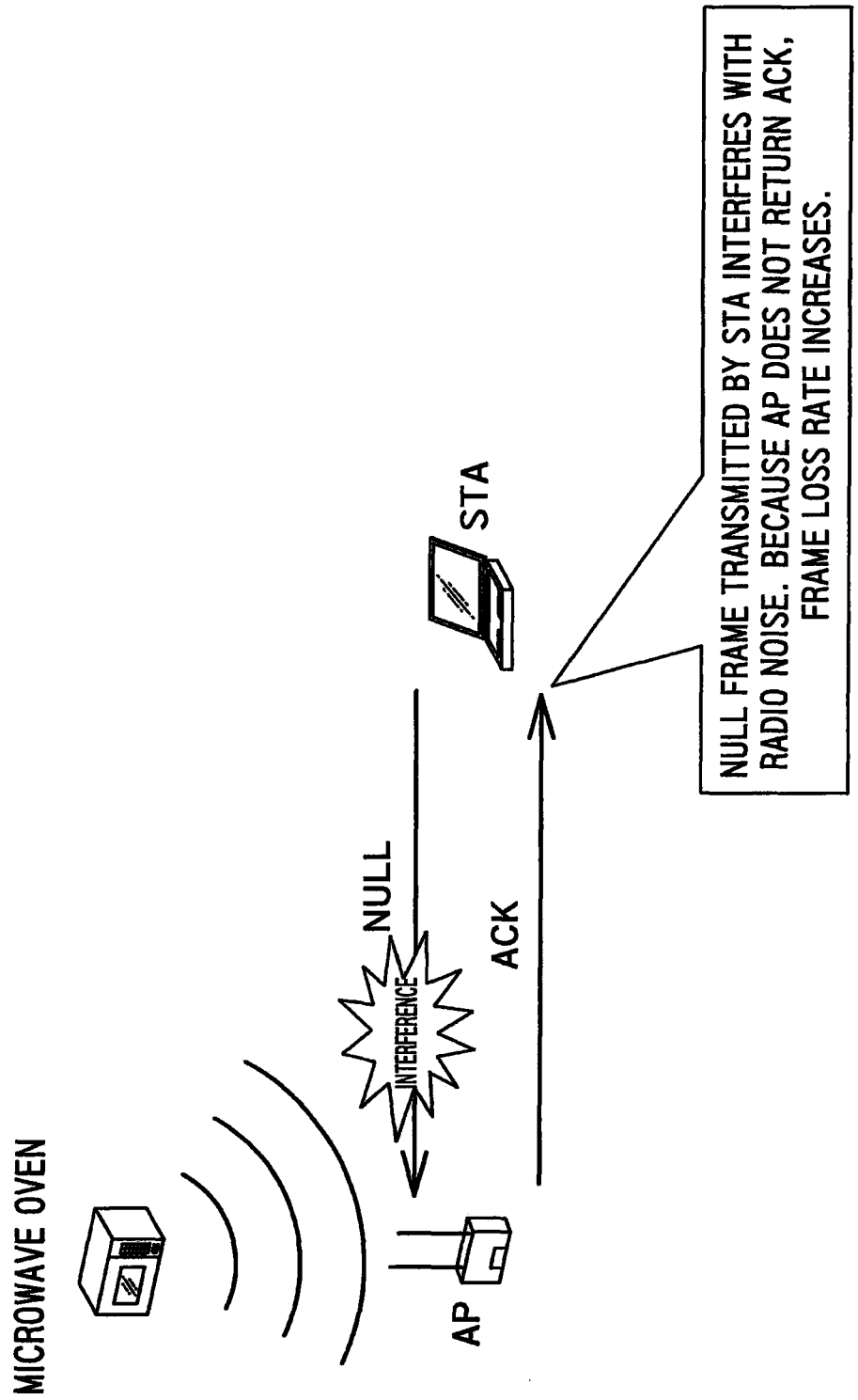
FIG. 15 shows a state in which interference due to radio noise has occurred in the neighborhood of a connection-destination radio station.

"Radio noise in the neighborhood of a connection-destination radio station" is defined as a state in which a radio wave of the same frequency band from a microwave oven, Bluetooth™ or the like, which is in conformity with a standard different from IEEE802.11, arrives at a connection-destination radio station of the radio station M. FIG. 15 shows a state in which interference due to radio noise (a microwave oven) has occurred in the neighborhood of a connection-destination radio station. If radio noise occurs in the neighborhood of a connection-destination radio station (AP) to which the radio station M (STA) is connected, a frame transmitted to AP by STA interferes with the radio noise. In the case of radio noise in the neighborhood of AP, failure in frame demodulation does not occur at STA. AP fails, however, in receiving of the frame transmitted by STA and does not return ACK, and therefore, the frame loss rate of STA increases.

Next, the correspondence information (the first correspondence information) showing relationships among radio link control schemes, faults and statistical information, and the correspondence information (the second correspondence information) showing relationships among frame loss rate measurement methods, faults and frame loss rates will be described.

FIG. 16 shows an example of the correspondence information (the first correspondence information) showing the relationships among radio link control schemes, faults and statistical information.

"Existence" and "non-existence" in the figure indicate a magnitude relationship between the value of statistical information and a threshold. "Existence" indicates that the value of statistical information is above a threshold set in advance, and "non-existence" indicates that the value of statistical information is equal to or below the threshold. The fault can be identified on the basis of comparison between the value of acquired statistical information and the threshold, and the correspondence information in FIG. 16. An example of identifying the fault is shown below.

When the value of statistical information (for example, noise level) obtained by performing the scheme 1 (for stopping communication between the apparatus itself and a radio base station) is determined to be "existence", the fault can be identified to be any of "radio noise", "adjacent-channel interference" and "congestion". When it is determined to be "non-existence", the fault can be identified to be any of "shadowing", "multi-path phasing", "radio noise in the neighborhood of a connection-destination radio station", "hidden terminal" and "no fault". If the fault is identified to be any of "radio noise", "adjacent-channel interference" and "congestion", and it is known in advance that there is no possibility of "adjacent-channel interference" or "radio noise", only "congestion" can be identified.

If, when the scheme 1+2 (for stopping communication between the apparatus itself and a radio base station and stopping communication of a different radio terminal which performs communication via the same channel) is performed in addition to the scheme 1, "existence" is determined for both the scheme 1 and the scheme 1+2, then the fault can be identified to be any of "radio noise" and "adjacent-channel interference". If "existence" and "non-existence" are determined for the scheme 1 and the scheme 1+2, respectively, then the fault can be identified to be "congestion". As statistical information used in the scheme 1+2, for example, the noise level of a channel used is conceivable.

If, when the scheme 1+2 and the scheme 1+3 (for stopping communication between the apparatus itself and a radio base station and stopping communication of a different radio terminal which performs communication via an adjacent channel) are performed, "existence" is determined for both the schemes 1+2 and 1+3, then the fault can be identified to be "radio noise". If "existence" and "non-existence" are determined for the scheme 1+2 and the scheme 1+3, respectively, then the fault can be identified to be "adjacent-channel interference". If "non-existence" and "existence" are determined for the scheme 1+2 and the scheme 1+3, respectively, then the fault can be identified to be "congestion". As statistical information used in the scheme 1+2, for example, the noise level of a channel used is conceivable.

If, when each of the scheme 1 and the scheme 4 (for transmitting a null frame after stopping communication of a different radio terminal using the same channel) is performed, "non-existence" and "existence" are determined for the scheme 1 and the scheme 4, respectively, then the fault can be identified to be any of "shadowing" and "multi-path phasing". If "non-existence" is determined for the scheme 1 and is also determined for the scheme 4, then the fault can be identified to be any of "radio noise in the neighborhood of a connection-destination radio station", "hidden terminal" and "no fault". As statistical information used in the scheme 4, for example, the number of CRC errors, the number of failures in PLCP preamble synchronization and the like are conceivable.

If, when each of the scheme 1 and the scheme 5 (for transmitting a null frame at a transmission rate lower than that of the scheme 4 after stopping communication of a different radio terminal using the same channel) is performed, "non-existence" is determined for both the scheme 1 and the scheme 5, then the fault can be identified to be any of "shadowing", "hidden terminal", "radio noise in the neighborhood of a connection-destination radio station" and "no fault". If "non-existence" and "existence" are determined for the scheme 1 and the scheme 5, respectively, then the fault can be identified to be "multi-path phasing". As statistical information used in the scheme 5, for example, the number of CRC errors, the number of failures in PLCP preamble synchronization and the like are conceivable.

FIG. 17 shows an example of the correspondence information (the second correspondence information) showing the relationships among frame loss rate measurement methods, faults and frame loss rates.

"Existence" in the figure indicates that the frame loss rate is above a threshold set in advance, and "non-existence" indicates that the frame loss rate is equal to or below the threshold. The fault can be identified on the basis of comparison between the value of a measured frame loss rate and the threshold, and the correspondence information in FIG. 17.

For example, if, when the fault is identified to be any of "hidden terminal", "radio noise in the neighborhood of a connection-destination radio station" and "no fault" by any of the methods described with reference to FIG. 16, the frame loss rate measured by transmission of a null frame (first measurement) is determined to be "existence", then the fault can be identified to be any of "hidden terminal" and "radio noise in the neighborhood of a connection destination". If "non-existence" is determined, then the fault can be identified to be "no fault".

If, when "existence" is determined in the first measurement, and loss rate measurement (second measurement) is performed in which a null frame is transmitted after preventing frame collision with a hidden terminal with the use of an RTS frame, the frame loss rate is determined to be "existence", then the fault can be identified to be "radio noise in the neighborhood of a connection-destination radio station". If "non-existence" is determined, then the fault can be identified to be "hidden terminal".

Figure 18:
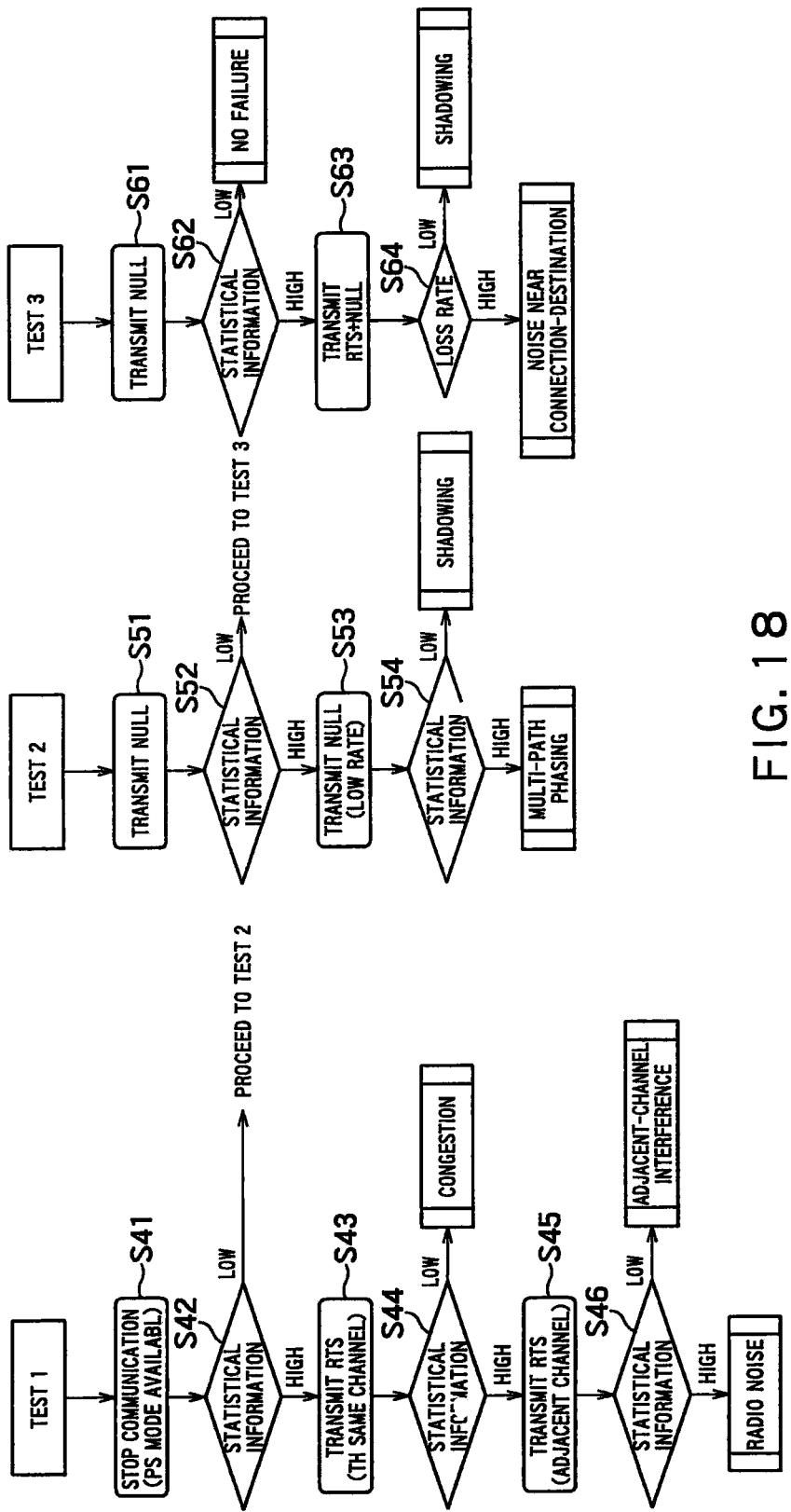
FIG. 18 shows an example of the process flow of a fault identification procedure.

FIG. 18 shows an example of the process flow of a fault identification procedure according to this embodiment.

First, radio link control of the scheme 1 (for stopping communication with the radio base station A) is executed by the radio link controlling unit 13, and statistical information is acquired by the statistical information acquiring unit 11 during the radio link control (step S41).

Next, the value of the acquired statistical information and a threshold are compared (step S42). When the value of the statistical information is above the threshold, the radio link controlling unit 13 executes radio link control of the scheme 1+2 (for stopping communication with the radio base station A and transmitting an RTS frame or a CTS frame for the same channel), and statistical information is acquired by the statistical information acquiring unit 11 during the radio link control (step S43).

Next, the value of the statistical information acquired at step S43 and a threshold are compared (step S44). If the value of the statistical information is equal to or below the threshold, then the fault is identified to be "congestion". When the value of the statistical information is above the threshold, the radio link controlling unit 13 executes radio link control of the scheme 3 (for stopping communication with the radio base station A and transmitting an RTS frame or a CTS frame for an adjacent channel), and statistical information is acquired by the statistical information acquiring unit 11 during the radio link control (step S45).

Next, the value of the statistical information acquired at step S45 and a threshold are compared (step S46). If the value of the statistical information is equal to or below the threshold, then the fault is identified to be "adjacent-channel interference". If the value of the statistical information is above the threshold, then the fault is identified to be "radio noise".

If the value of the statistical information is equal to or below the threshold at step S42, then the radio link controlling unit 13 performs radio link control of the scheme 4 (for performing transmission of a null frame protected by an RTS frame) and acquires statistical information during the radio link control. The loss rate measuring unit 14 may be used to transmit the null frame (step S51) (in this case, it is possible to calculate a frame loss rate and execute the second measurement in FIG. 17 simultaneously).

Next, the value of the statistical information acquired at step S51 and a threshold are compared (step S52). If the value of the statistical information is above the threshold, then the radio link controlling unit 13 performs radio link control of the scheme 5 (for transmitting a null frame protected by an RTS frame at a low rate) and acquires statistical information during the radio link control (step S53). The loss rate measuring unit 14 may be used to transmit the null frame.

Next, the value of the statistical information acquired at step S53 and a threshold are compared (step S54). If the value of the statistical information is equal to or below the threshold, then the fault is identified to be "shadowing". If the value of the statistical information is above the threshold, then the fault is identified to be "multi-path phasing".

When the value of the statistical information is determined to be equal to or below the threshold at step S52, the loss rate measuring unit 14 executes the first measurement (measurement of a frame loss rate by transmission of a null frame) described above (step S61).

Next, the frame loss rate and a threshold are compared (step S62). If the frame loss rate is equal to or below the threshold, then the fault is identified to be "no fault". When the frame loss rate is above the threshold, the loss rate measuring unit 14 executes the second measurement (frame loss rate measurement in which protection by an RTS frame is performed to transmit a null frame) described above (step S63).

Next, the frame loss rate acquired at step S63 and a threshold are compared (step S64). When the frame loss rate is equal to or below the threshold, the fault is identified to be "hidden terminal". If the frame loss rate is above the threshold, then the fault is identified to be "radio noise in the neighborhood of a connection-destination radio station".

Through the flow above, the fault can be identified to be any one of "congestion", "radio noise", "adjacent-channel interference", "shadowing", "multi-path phasing", "hidden terminal", "radio noise in the neighborhood of a connection-destination radio station" and "no fault". Thus, according to this embodiment, it is possible to accurately identify the fault in radio communication.

In the embodiment described above, as for the threshold of statistical information and the threshold of a frame loss rate, a different value can be set individually for each fault, and the thresholds may be dynamically updated accompanying change in the environment around a wireless LAN system or change in an application used by a radio terminal.

The statistical information adopted in this embodiment can be acquired irrespective of whether connection between the radio base station A and the radio terminal B has been established or not. Similarly, the radio link control schemes and the frame loss rate measurement methods adopted in this embodiment can be performed irrespective of whether connection between the radio base station A and the radio terminal B has been established or not. Thus, the method of presuming the fault shown in this embodiment is advantageous in that it can be realized even in a situation in which the propagation quality is extremely low and connection cannot be established, for example.

Furthermore, when the fault can be identified, the fault can be immediately notified to an administrator by a mail or the like to urge him to take measures. Furthermore, as for a fault for which measures can be dynamically taken by controlling a radio base station, such as congestion, it is possible to request the measures to an appropriate apparatus and this enables to automate a series of processes from identifying the fault to taking measures.

(Second Embodiment)

In conventional wireless LAN systems, when frame loss occurs, such control works that gives tolerability to frame loss by decreasing the transmission rate. In general, this control is effective when the SNR (Signal/Noise Ratio) decreases due to shadowing. In the case where frame loss occurs due to congestion, however, the control leads to suppression of an available band of a radio link, and there is a possibility that the throughput is significantly decreased. Therefore, in this embodiment, an example will be described in which, when the fault is identified to be congestion, suitable measures are taken according to the identified fault. As methods for identifying congestion, there are a method using a channel use rate and also a retransmission rate and a method using the first embodiment. The former will be described first below, and, after that, the latter will be described.

Figure 19:
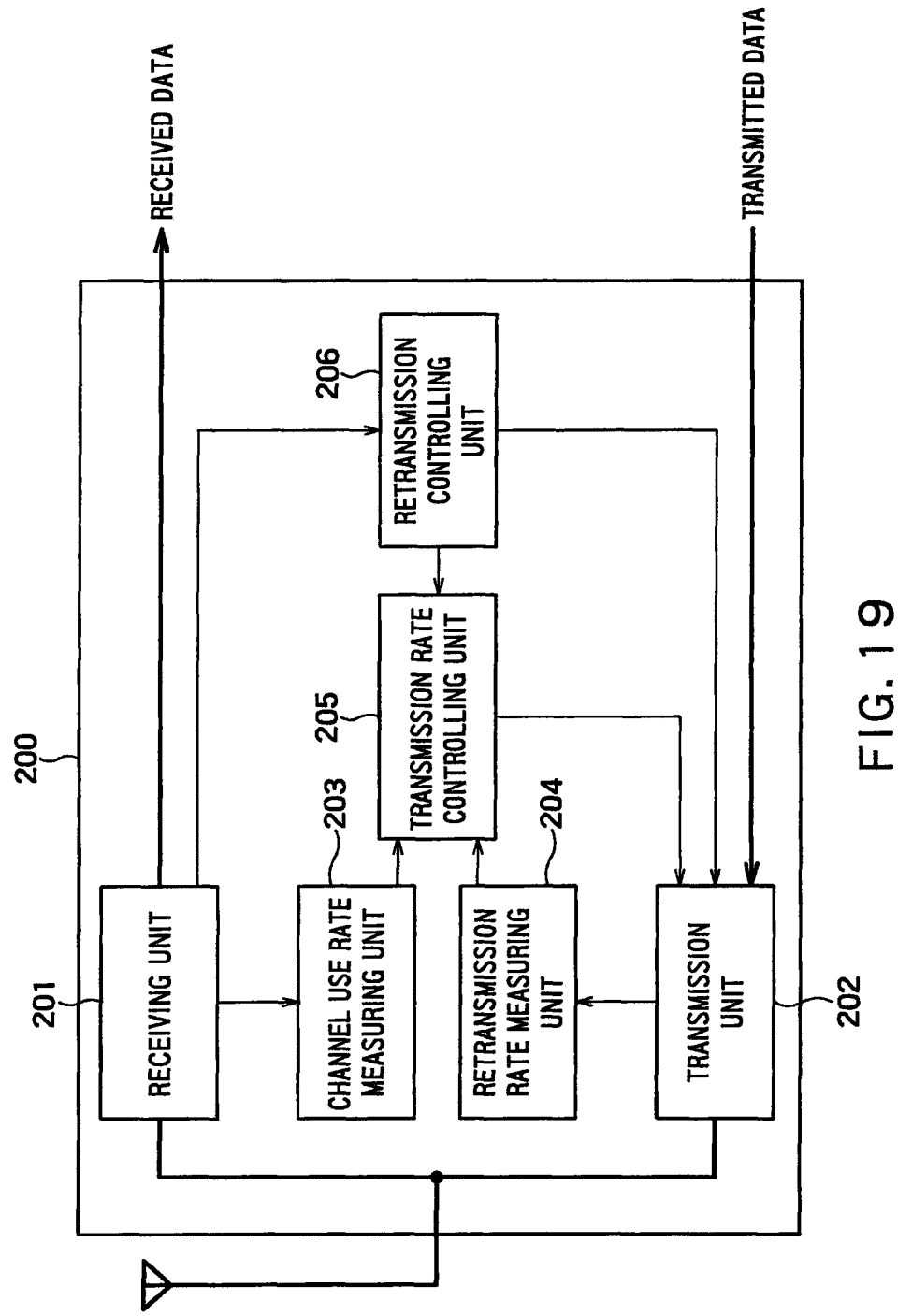
FIG. 19 shows a configuration example of a radio station according to a second embodiment.

FIG. 19 is a block diagram showing a configuration example of a radio station according to this embodiment.

A radio station 200 (for example, corresponding to the radio terminal B in FIG. 1) is provided with a transmission unit 202 which wirelessly transmits a frame to a communication counterpart (for example, corresponding to the radio base station A in FIG. 1), a receiving unit 201 which wirelessly receives a frame from the communication counterpart, a retransmission rate measuring unit 204 which measures a retransmission rate from the rate of the number of retransmitted frames to the number of transmitted frames, a channel use rate measuring unit 203 which measures a channel use rate from the rate of a period during which a channel is used to a predetermined period, a transmission rate controlling unit 205 which controls the rate of transmitting a frame (especially a retransmitted frame) on the basis of the retransmission rate and the channel use rate, and a retransmission controlling unit 206 which controls whether or not to perform retransmission.

The receiving unit 201 receives a radio signal from an antenna, and it inputs carrier information "busy" to the channel use rate measuring unit 203 if the signal strength of the channel used is equal to or above a predetermined carrier sense level, and inputs carrier information "idle" to the channel use rate measuring unit 203 if the signal strength is below the carrier sense level. The receiving unit 201 further performs physical layer processing and MAC layer processing of the received signal. If user data is included in the received signal, the receiving unit 201 inputs the user data to an upper layer.

If the signal received by the receiving unit 201 is an ACK frame destined for the radio station 200, the retransmission controlling unit 206 is notified that the ACK frame has been received.

The channel use rate measuring unit 203 measures the rate (channel use rate) of a period during which the carrier information inputted from the receiving unit 201 indicates "busy" to a predetermined period (for example, 60 seconds), and updates the rate at a predetermined timing (for example, every one millisecond or when the carrier information changes). Furthermore, the channel use rate measuring unit 203 inputs the measured channel use rate to the transmission rate controlling unit 205.

If receiving a notification that an ACK frame has been received, within a predetermined time after transmitting a radio signal, the retransmission controlling unit 206 notifies the transmission unit 202 to transmit the next data. If not receiving the notification that an ACK frame has been received, within the predetermined time, the retransmission controlling unit 206 notifies the transmission unit 202 to retransmit the transmitted data. Furthermore, the retransmission controlling unit 206 notifies the number of retransmissions of the same frame, to the transmission rate controlling unit 205. When a predetermined condition (for example, the number of retransmissions or retransmission time exceeds a predetermined value) is satisfied, the retransmission controlling unit 206 may notify the transmission unit 202 to transmit the next data even if an ACK frame has not been received.

The retransmission rate measuring unit 204 measures the rate of retransmitted frames to a predetermined number of frames (for example, 1000 frames) transmitted by the transmission unit 202 (a retransmission rate), and updates the rate at a predetermined timing (for example, every 1 millisecond or each time a frame is transmitted). Furthermore, the retransmission rate measuring unit 204 inputs the measured retransmission rate to the transmission rate controlling unit 205.

The transmission rate controlling unit 205 controls the transmission rate of a frame to be transmitted, on the basis of predetermined rules (for example, the transmission rate is gradually changed to a lower value according to the number of retransmissions notified by the retransmission controlling unit 206. If an ACK frame is received in response to a first transmission, a rate of a first transmission of the next data is changed to a higher value than the previous rate). However, if the retransmission rate inputted from the retransmission rate measuring unit 204 exceeds a predetermined threshold A, and the channel use rate inputted from the channel use rate measuring unit 203 exceeds a predetermined threshold B, it is determined that congestion has occurred, and the transmission rate is not decreased but maintained.

Figure 20:
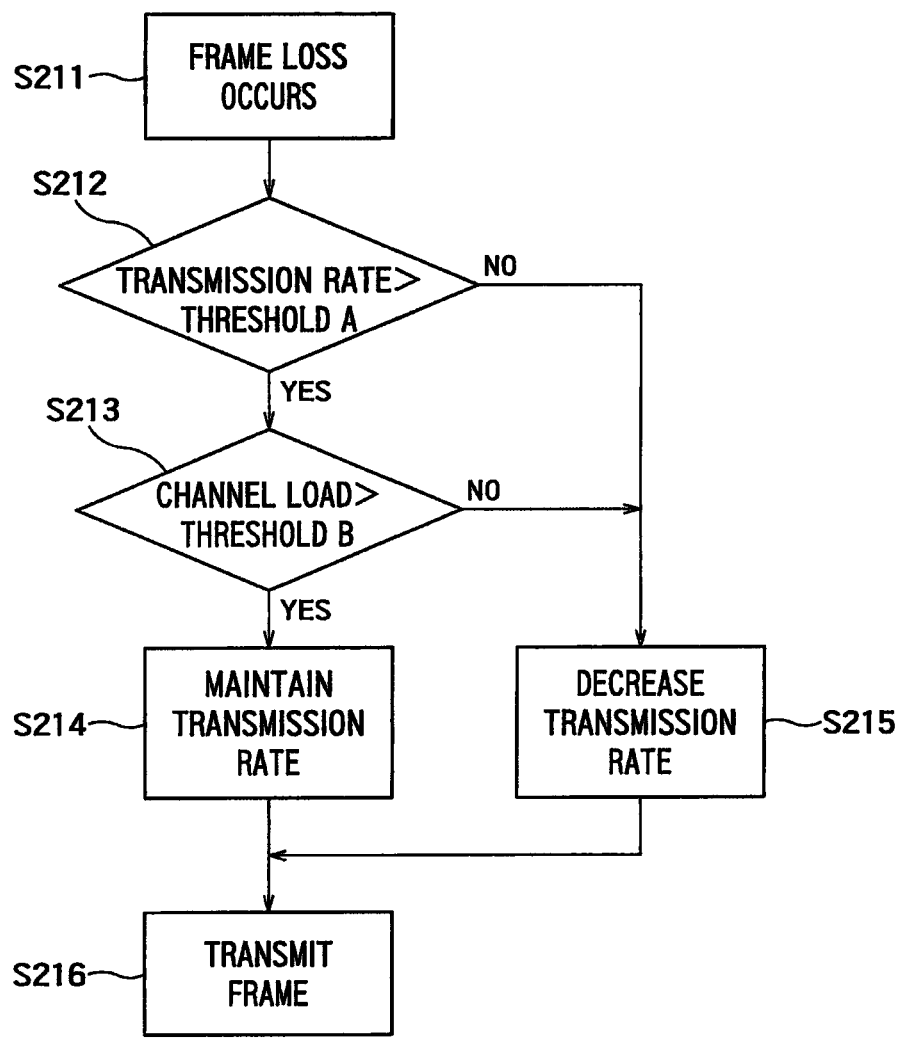
FIG. 20 shows the flow of an operation of the radio station in FIG. 19.

FIG. 20 is a flowchart showing the flow of an operation of the radio station 200.

For example, it is assumed that the thresholds A and B of the radio station 200 are set to 10% and 60%, respectively, and the retransmission rate, the channel use rate and the previous transmission rate are 5%, 70% and 48 Mbps, respectively. Here, if an ACK frame in response to data transmitted from the transmission unit 202 the previous time is not received within a predetermined time, then the retransmission controlling unit 206 notifies the transmission unit 202 to retransmit the transmitted data and notifies the transmission rate controlling unit 205 of the number of retransmissions (for example, 1) (S211).

Since the retransmission rate does not exceed the threshold A (S212: No), the transmission rate controlling unit 205 changes the transmission rate of a frame to be retransmitted next to 36 Mbps, a one-stage lower rate, and notifies the transmission unit 202 of an instruction to retransmit the frame (S215). The transmission unit 202 transmits the transmitted data at 36 Mbps on the basis of the retransmission instruction received from the retransmission controlling unit 206 and the transmission rate received from the transmission rate controlling unit 205 (S216).

Next, if a frame loss occurs when thresholds similar to the above are used, and the retransmission rate, the channel use rate and the previous transmission rate are 15%, 70% and 48 Mbps, respectively (S211), then the transmission rate controlling unit 205 determines that congestion has occurred because the retransmission rate exceeds the threshold A (S212: Yes) and the channel use rate exceeds the threshold B (S213: Yes) and maintains 48 Mbps as the transmission rate of a frame to be retransmitted next (S214). The transmission unit 202 transmits a frame destined for a communication counterpart in accordance with the notification from the retransmission controlling unit 206 and the transmission rate from the transmission rate controlling unit 205 (S216).

Figure 21:
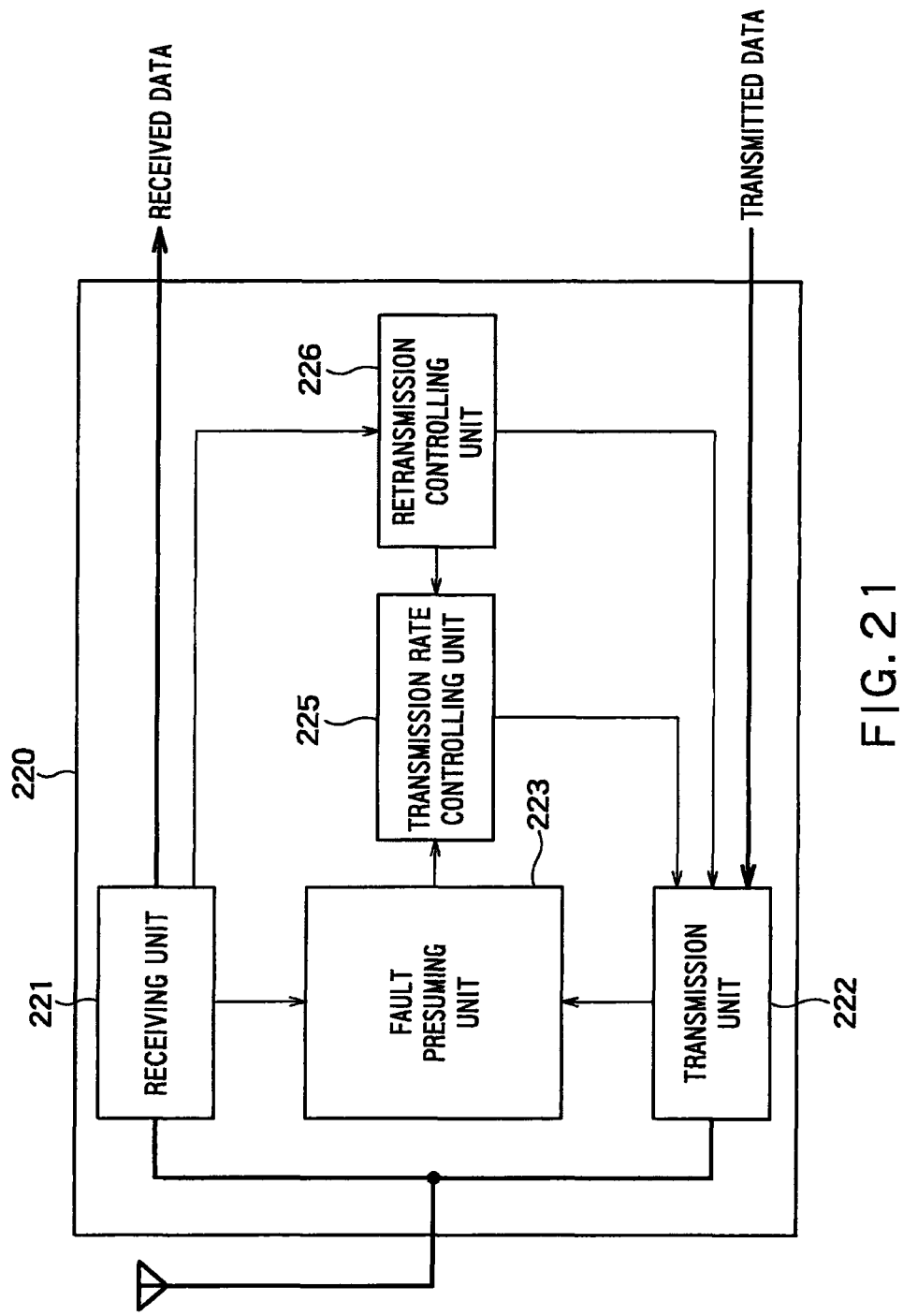
FIG. 21 shows another configuration example of the radio station according to the second embodiment.

FIG. 21 is a block diagram showing another configuration example of the radio station according to this embodiment.

A radio station 220 (for example, corresponding to the radio terminal B in FIG. 1) is provided with a transmission unit 222 which wirelessly transmits a frame to a communication counterpart (for example, corresponding to the radio base station A in FIG. 1), a receiving unit 221 which wirelessly receives a frame from the communication counterpart, a transmission rate controlling unit 225 which controls the transmission rate of a frame (especially a retransmitted frame), a retransmission controlling unit 226 which controls whether or not to perform retransmission and a fault presuming unit 223 which presumes the fault. The fault presuming unit 223 includes the statistical information acquiring unit, the statistical information DB, the radio link controlling unit, the loss rate measuring unit and the fault identifying unit in FIG. 2, and the fault presuming unit 223 presumes the fault of a radio link in accordance with the operation of the first embodiment.

The transmission rate controlling unit 205 controls the transmission rate of a frame to be transmitted on the basis of the predetermined rules described above. However, when the fault is presumed to be congestion by the fault presuming unit 223, the transmission rate is not decreased but maintained.

Figure 22:
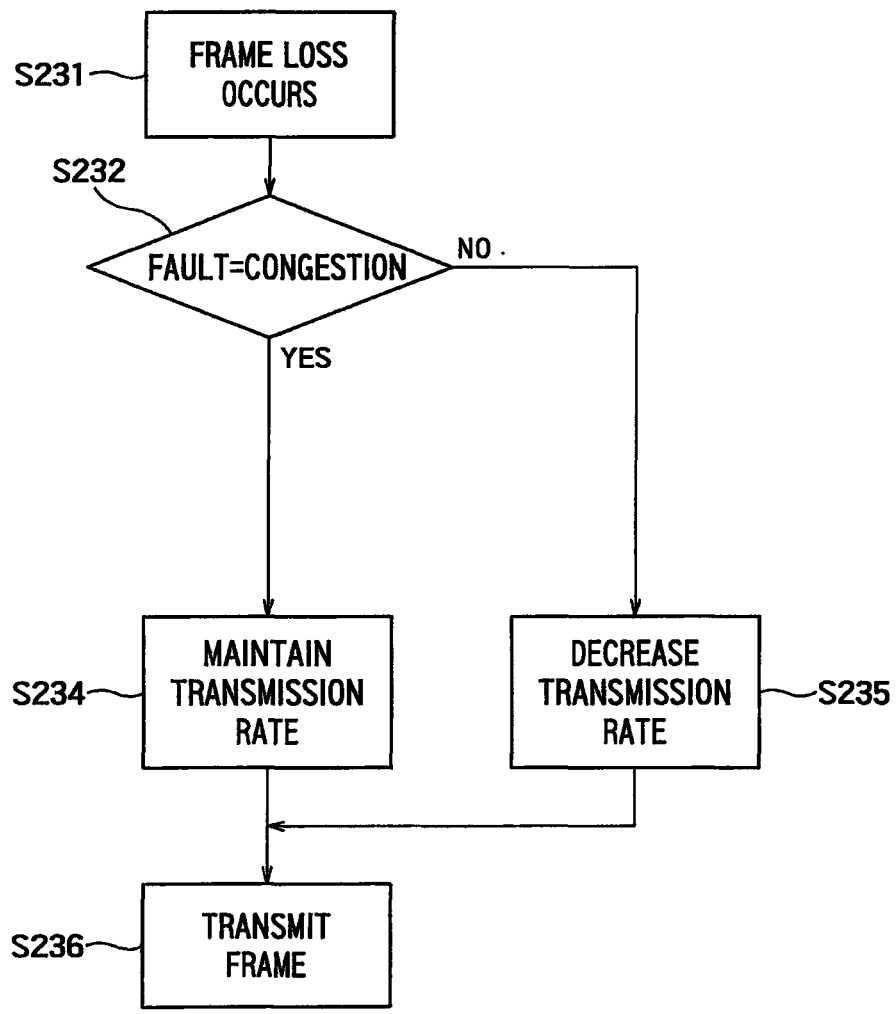
FIG. 22 shows the flow of an operation of the radio station in FIG. 21.

FIG. 22 is a flowchart showing the flow of an operation of the radio station 220.

It is assumed that the previous transmission rate is 48 Mbps. If an ACK frame in response to data transmitted from the transmission unit 222 the previous time is not received within a predetermined time, then the retransmission controlling unit 226 notifies the transmission unit 222 to retransmit the transmitted data and notifies the transmission rate controlling unit 225 of the number of retransmissions (for example, 1) (S231).

When not being notified of congestion from the fault presuming unit 223, the transmission rate controlling unit 225 changes the transmission rate of a frame to be retransmitted next to 36 Mbps, a one-stage lower rate, and notifies the transmission unit 222 of an instruction to retransmit the frame (S235). The transmission unit 222 transmits the transmitted data at 36 Mbps on the basis of the retransmission instruction received from the retransmission controlling unit 226 and the transmission rate received from the transmission rate controlling unit 225 (S236). On the other hand, when being notified of congestion at step S232 (Yes), the transmission rate controlling unit 225 maintains 48 Mbps as the transmission rate of a frame to be retransmitted next (S234). The transmission unit 222 transmits a frame destined for a communication counterpart in accordance with the notification from the retransmission controlling unit 226 and the transmission rate from the transmission rate controlling unit 225 (S236).

As described above, according to the second embodiment, it is possible to obtain an advantage of, when the fault is identified to be congestion, preventing decrease in throughput by maintaining the transmission rate of a frame to be retransmitted. Though an example has been shown in which the transmission rate of a frame to be retransmitted is maintained, it is also possible to maintain the transmission rate for frames to be transmitted subsequently until congestion is resolved.

The present invention is not limited to the exact embodiments described above and can be embodied with its components modified in an implementation phase without departing from the scope of the invention. Also, arbitrary combinations of the components disclosed in the above-described embodiments can form various inventions. For example, some of the all components shown in the embodiments may be omitted. Furthermore, components from different embodiments may be combined as appropriate.

The invention claimed is:

1. A radio station connected to another radio station via a radio link and identifying a fault of the radio link, comprising:
a radio link controlling unit configured to execute radio link control of the radio link in accordance with a radio link control scheme:
a statistical information acquiring unit configured to acquire statistical information indicating a state of the radio link during the execution of the radio link control: and
a fault identifying unit configured to identify the fault of the radio link from among a plurality of faults associated with statistical information, on the basis of the statistical information acquired by the statistical information acquiring unit, wherein the radio link control scheme includes at least two of:
a scheme 1 in which communication with the another radio station is stopped;
a scheme 2 in which communication by a different radio station using same channel as that used by the another radio station is stopped;
a scheme 3 in which communication by a different radio station using a channel adjacent to the channel used by the another radio station is stopped;
a scheme 4 in which communication by a different radio station using same channel as that used by the another radio station is stopped, and a test frame is transmitted to the another radio station; and
a scheme 5 in which communication by a different radio station using same channel as that used by the another radio station is stopped, and a test frame is transmitted to the another radio station at a lower rate than a rate of the scheme 4,
wherein,
the statistical information and the faults are associated for each of the schemes 1 to 5,
the radio link controlling unit is configured to execute the radio link control of the radio link in accordance with each of the at least two of schemes 1-5 and
the fault identifying unit identifies the fault according to one that has been executed among the at least two of schemes 1-5 and the statistical information acquired by the statistical information acquiring unit during the execution of the radio link control of the one scheme.

2. The radio station according to claim 1, wherein
the radio link controlling unit executes the scheme 1 and executes the scheme 1 and the scheme 2 simultaneously; and
the fault identifying unit identifies the fault of the radio link on the basis of statistical information obtained by the execution of the scheme 1 and statistical information obtained by the simultaneous execution of the scheme 1 and the scheme 2.

3. The radio station according to claim 2, wherein
the radio link controlling unit executes the scheme 1 and the scheme 3 simultaneously; and
the fault identifying unit identifies the fault of the radio link on the basis of statistical information obtained by the simultaneous execution of the scheme 1 and the scheme 3.

4. The radio station according to claim 3, wherein
the radio link controlling unit executes the scheme 4; and
the fault identifying unit identifies the fault of the radio link using statistical information obtained by the execution of the scheme 4.

5. The radio station according to claim 4, wherein
the radio link controlling unit executes the scheme 5; and
the fault identifying unit identifies the fault of the radio link using statistical information obtained by the execution of the scheme 5.

6. The radio station according to claim 5, further comprising a measurement unit configured to transmit test frames to the another radio station and measures frame loss rate on the basis of a total number of transmitted test frames and a total number of response frames from the another radio station; wherein
the fault identifying unit holds correspondence between the frame loss rate and the faults, and uses the measured frame loss rate to identify the fault of the radio link on the basis of the correspondence.

7. The radio station according to claim 6, wherein
the measurement unit transmits the test frames to the another radio station after transmitting a frame instructing to stop communication of the different radio station via the same channel as that used by the another radio station.

8. The radio station according to claim 7, compromising:
a communication unit configured to transmit/receive frames to/from the another radio station;
a retransmission controlling unit configured to perform retransmission control of the frames; and
a transmission rate controlling unit configured to decrease the transmission rate as the total number of frames retransmitted to the another radio station or a retransmission rate of the frames increases; wherein
when the fault is determined to be congestion, the transmission rate controlling unit maintains the transmission rate irrespective of increase in the total number of retransmitted frames or the rate of retransmission of the frames.

9. The radio station according to claim 8, wherein
the fault identifying unit identifies the fault to be congestion if a value of the statistical information obtained by the scheme 1 is above a first threshold and a value of the statistical information obtained by the scheme 4 is equal to or below a second threshold.

10. A radio station connected to another radio station via a radio link and identifying a fault of the radio link, compromising:
a radio link controlling unit configured to execute radio link control of the radio link in accordance with a radio link control scheme;
a statistical information acquiring unit configured to acquire statistical information indicating a state of the radio link during the execution of the radio link control;

a fault identifying unit configured to identify the fault of the radio link from among a plurality of faults associated with statistical information, on the basis of the statistical information acquired by the statistical information acquiring unit;

a communication unit configured to transmit/receive frames to/from the another radio station:

a retransmission controlling unit configured to perform retransmission control of the frames:

a retransmission rate measuring unit configured to measure a retransmission rate which is a rate of the number of retransmitted frames to the number of frames transmitted to the another radio station;

a channel use rate measuring unit configured to measure a channel use rate based on a rate of a period during which the channel is being used to a predetermined period; and a transmission rate controlling unit configured to control a transmission rate of the frames on the basis of the retransmission rate and the channel use rate; wherein the transmission rate controlling unit maintains the transmission rate when the retransmission rate is above a threshold A and the channel use rate is above a threshold B, and decreases the transmission rate when the retransmission rate is equal to or below the threshold A or the channel use rate is equal to or below the threshold B.

* * * * *